(12) United States Patent
Ishibashi et al.

(10) Patent No.: US 7,180,842 B2
(45) Date of Patent: Feb. 20, 2007

(54) OPTICAL DISC CUTTING APPARATUS AND METHOD FOR MANUFACTURING OPTICAL DISC

(75) Inventors: Kenzo Ishibashi, Moriguchi (JP); Keiji Nishikiori, Yawata (JP); Yasumori Hino, Ikoma (JP); Masahiro Birukawa, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 768 days.

(21) Appl. No.: 10/264,592

(22) Filed: Oct. 4, 2002

(65) Prior Publication Data

US 2003/0067851 A1    Apr. 10, 2003

(30) Foreign Application Priority Data

Oct. 5, 2001    (JP)    ............................. 2001-309585

(51) Int. Cl.
G11B 11/03    (2006.01)
(52) U.S. Cl. ................................ 369/53.25; 369/124.04
(58) Field of Classification Search .................... None
See application file for complete search history.

(56) References Cited

U.S. PATENT DOCUMENTS 4,535,431 A * 8/1985 Bricot et al. ............. 369/44.13
5,478,701 A * 12/1995 Jung .......................... 430/321
5,809,006 A * 9/1998 Davis et al. .............. 369/47.49
6,580,681 B1 * 6/2003 Kashiwagi ............... 369/275.3

FOREIGN PATENT DOCUMENTS

JP    10-261245    9/1998
JP    11-288531    10/1999

* cited by examiner

Primary Examiner—Paul W. Huber
(74) Attorney, Agent, or Firm—Hamre, Schumann, Mueller & Larson, P.C.

(57) ABSTRACT

An optical disc cutting apparatus capable of suppressing an unnecessary deflection component and unnecessary light intensity variation component and manufacturing a optical disc suitable for a high definition, high precision and high density optical disc. The optical disc cutting apparatus includes a light beam controller including at least one of an optical modulator for controlling the light intensity of light beam emitted from a laser beam source and an optical deflector for controlling the deflection amount of the light beam in the radial direction on an optical disc original master, a deflection error detector for detecting a deflection error in the radial direction included in the light beams controlled by the light beam controller, a second optical deflector, which is disposed between the light beam controller and the deflection error detector, for deflecting the light beams in the radial direction, and a feedback controller for feeding back a feedback signal using the deflection error in the radial direction to the second optical deflector.

10 Claims, 11 Drawing Sheets

Fluctuation after deflection

Relationship between deflection amount and detected voltage Vdet

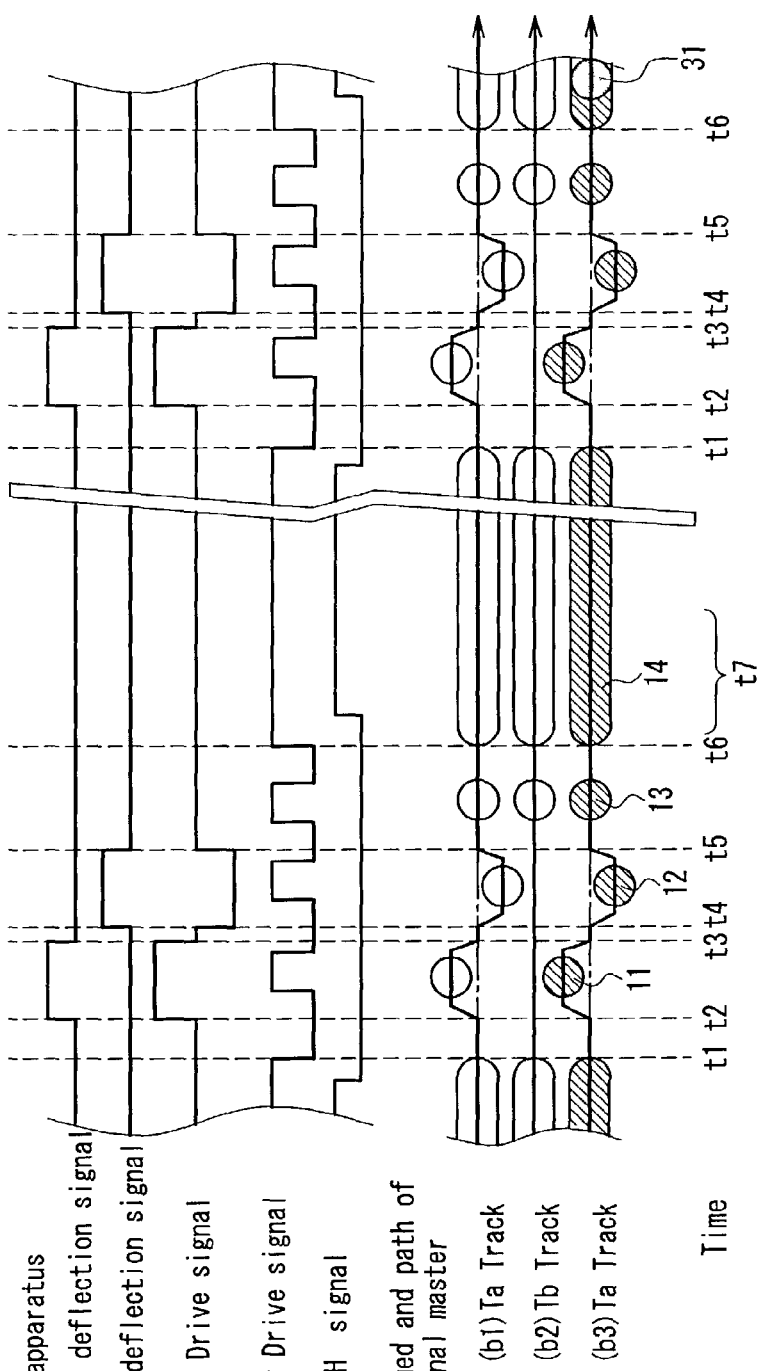
FIG. 3A (a) Timing chart of cutting apparatus
(a1) Vedi: Inner direction deflection signal
(a2) Vedo: Outer direction deflection signal
(a3) Vodd: EOD Drive signal
(a4) Vemd: EMO Drive signal
(a5) S/H signal
FIG. 3B (b) Optical disk to be formed and path of optical spot on original master
(b1) Ta Track
(b2) Tb Track
(b3) Ta Track

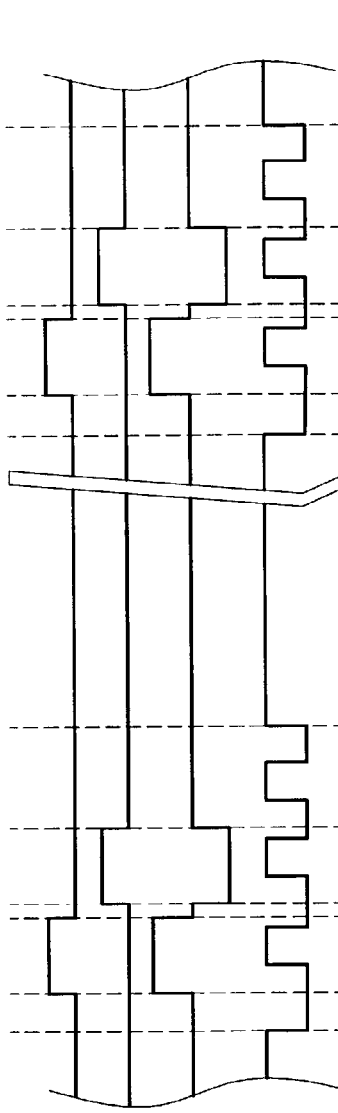
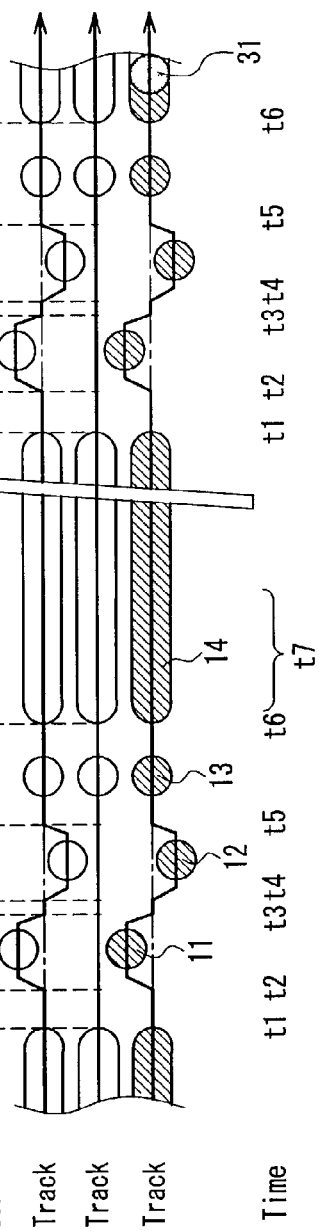
FIG. 11A PRIOR ART
(a) Timing chart of cutting apparatus
(a1) Vedi: Inner direction deflection signal
(a2) Vedo: Outer direction deflection signal
(a3) Vodd: EOD Drive signal
(a4) Vemd: EMO Drive signal
FIG. 11B PRIOR ART
(b) Optical disk to be formed and path of optical spot on original master
(b1) Ta Track
(b2) Tb Track
(b3) Ta Track

OPTICAL DISC CUTTING APPARATUS AND METHOD FOR MANUFACTURING OPTICAL DISC

BACKGROUND OF THE INVENTION

1. Field of the Invention

The present invention relates to an optical disc cutting apparatus and a method for manufacturing an optical disc.

2. Description of the Related Art

Recently, optical discs increasingly have been applied to an AV (audio visual) field. For example, in DVD (Digital Versatile Disc) mainly for movie contents, write-once type and re-writable type formats such as DVD-R, DVD-RAM, DVD-RW, have been developed and are becoming widespread as a next generation recording apparatus of VTR.

In the future, with the availability of BS digital broadcasts or broadband communication, large capacity optical disc formats capable of recording higher quality compressed pictures and optical disc formats having a small and portable size even with the same capacity and exhibiting high affinity to the network are expected.

In order to realize a high-density optical disc as mentioned above, it is indispensable to develop materials and formats capable of recording with high density as well as to develop an optical disc substrate suitable for high definition, high precision and high density. A cutting method that is a headstream step thereof plays a key role in achieving high density. More specifically, it is important to produce narrow-pitch tracks and fine prepits on an original master precisely.

It is important to minimize an optical spot and to align the position of optical spots with high precision. The former can be realized by shortening a wavelength of a laser beam source and making the NA of an objective lens to be high. The latter can be realized by making a feeding mechanism of an objective lens to have high precision, lowering the vibration of a cutting apparatus and enhancing the precision of the deflection in the case where an optical disc needs wobble, and the like.

In the explanation mentioned below, an optical disc cutting method will be explained as an embodiment of an optical disc cutting apparatus for specifically realizing the method. FIG. 9 shows an example of a conventional optical disc cutting apparatus and shows only basic component elements.

Reference number 1 denotes a laser beam source from which a predetermined light intensity of parallel light beam Lc is emitted. In general, Ar gas laser is used. A light source of the visible light region, in which the wavelength to be used is in the 500 nm range, conventionally has been used. However, a shorter wavelength has been used in accordance with the needs of high density, and recently, light sources of ultraviolet spectrum of wavelength between 200 nm and 300 nm are used.

Reference number 2 denotes an EO modulator (EOM: Electro-Optic Modulator) capable of changing a light intensity in an analog way by an applied voltage. In general, by applying two levels of voltage, binary level of light intensity corresponding to ON and OFF is selected to form prepits of the optical disc by modulating in a digital way. And grooves are formed by keeping ON level. Reference number 3 denotes an EO deflector (EOD: Electro-Optic Deflector) for deflecting the angle in which the light beam progresses by the applied voltage and displacing an optical spot for cutting formed on an original master 100 by an objective lens 5 mentioned below. The original master is hereinafter referred to as "optical disc" or "optical disc original master."

As materials for the EO modulator 2 and the EO deflector 3, crystalline materials having a so-called Pockels effect are used in which refractive index anisotropy is changed when high voltage is applied. In order to obtain a deflection amount or modulation amount that is effective in cutting, it is necessary to apply high voltage of, for example, ±200V to a portion between two electrodes provided on the EO element. Furthermore, instead of the EO element, an acoustic-optical element system called an AO (Acoustic-Optic) element may be used.

Light beam Lc passing through the EO modulator 2 and the EO deflector 3 are reflected by a mirror 4 and converged by the objective lens 5 having a high NA, thus forming an optical spot Sc on an original master 100 whose rotation is controlled by a motor 6. The mirror 4 and the objective lens 5 are formed of an optical head for cutting held by a mechanism (not shown in the drawing) and transported continuously and precisely corresponding to the track pitch in accordance with the rotation of the motor 6 by a transport system (not shown in the drawing). In cutting, a CAV (constant angular velocity) mode in which the rotation speed is constant or a CLV (constant linear velocity) mode in which the linear velocity is constant is used in general.

By continuously transporting one track pitch per rotation of the original master precisely, a spiral track is formed on the original master. In the case of the CAV mode, the light intensity of the laser beam source 1 is controlled to be an appropriate value according to a cutting radius. The optical disc formed in the transport direction as shown in FIG. 9 is subjected to cutting by the CAV mode with the lead-in located at an inner position.

Reference number 101 denotes a formatter of an optical disc that forms prepits or grooves on the original master by controlling the EO modulator 2 and the EO deflector 3 while controlling the light intensity of the laser beam source 1 and the rotation speed of the motor 6, thereby forming a desired optical disc format. An output signal Vem of the formatter 101 is transmitted to an EOM driver 102. The EOM driver 102 directly amplifies Vem or switches on a high voltage power source to generate an EOM drive signal Vemd and feed it to the EO modulator 2, thus modulating the light intensity of the light beam Lc. Herein, the light beam Lc is made ON/OFF by "H"/"L" control of the signal Vem.

Furthermore, the deflection signal Ved of the formatter 101 displaces the position of the optical spot on the original master in the radial direction. That is, in accordance with polarities, "positive, zero, negative" of the deflection signal Ved, "inner direction displacement, neutral, outer direction displacement" are controlled, respectively. The EOD driver 103 receives a deflection signal Ved and directly amplifies thereof (hereinafter, referred to as "analog deflection mode") or switches on a high voltage power source (hereinafter, referred to as "digital deflection mode") to generate the EOD drive signal Vedd and feed it to the EO deflector 3, thus controlling the deflection amount of the light beam Lc.

Practically, when clock and address information are superimposed on the grooves by wobbling, small displacement of several tens nm order is required for the wobbling on the original master of the optical disc. Since the applied voltage is as small as several tens V, the analog deflection mode using an amplifier is employed. In order to achieve a step-wise displacement amount of several hundreds nm like a sample servo method, etc., the digital deflection mode is employed. In the latter case, in order to simplify a circuit, the deflection signal Ved is formed of two control signals showing the deflection to the inner position or deflection to the outer position, and according to the signal, the voltages are applied to the two terminals of the EO deflector 3 alternatively in a way by exchanging the conduct to the positive pole or the negative pole of the power source of, for example, about +200V, thereby obtaining an EOD drive signal of ±200V, equivalently.

Light beam Li shown by broken lines in FIG. 9 show the state in which the EO deflector 3 deflects the light beam Lc when the deflection signal Ved is positive. As a result, the light spot Sc is displaced from the position Sc to the inner position Si.

FIG. 10A and 10B show two specific examples of the optical disc that can be formed by the above-mentioned optical disc cutting apparatus. An operation of one of the examples of the optical discs shown in FIG. 10A will be explained with reference to FIGS. 11A and 11B.

FIG. 10A shows an example of an optical disc substrate of a sample servo method with grooves, and FIG. 10B shows an example of an optical disc substrate of a land-groove continuous servo method. In both figures, the upper side is an inner position and the lower side is an outer direction and recording/reproducing of optical spots scans from left to right.

An optical disc substrate shown in FIG. 10A is a substrate suitable for a DWDD (Domain Wall Displacement Detection) technique that is one of a super-resolution techniques of a magneto-optical disc. In the case of DWD optical disc, it is necessary to weaken magnetic coupling (reducing the magnetic anisotropy) between adjacent recording tracks. Therefore, when the DWDD optical disc is manufactured, it is necessary to carry out the initialization for weakening the magnetic coupling between the adjacent recording tracks (hereinafter, referred to as "annealing") before recording information signals. Grooves are used at the time of the annealing.

The component unit of this optical disc is a segment as shown in the drawing. The segment includes a servo region and a data region. One track includes 1000 segments or more. In the servo region, first wobble pit 11, second wobble pit 12 and address pit 13 for sample servo are disposed. The tracking of the sample servo method is controlled so that the recording/reproducing light spot scans the middle portion between the first wobble pit 11 and the second wobble pit 12.

The address pit 13 is dispersed in a plurality of segments in which the presence or absence of the pits in every segment is collected and subjected to error correction and then reproduced as a track address. The information track of the data region includes groove 14. A portion between the information tracks is a land 15. Since the track pitch in this case is as small as 0.6 μm or less, it is difficult to form wobble pits independently in each track. Therefore, the wobble pits are shared by adjacent tracks. In other words, the track is basically classified into two kinds, that is, Ta and Tb as shown in the drawing.

When the track Ta is assumed to be an even number track 2m, the recording/reproducing light spot 16 scans so that the first wobble pit 11 is located left and the second wobble pit 12 is located right with respect to the recording/reproducing light spot 16. The track Tb is an odd number track 2m+1, and contrary to track Ta, the recording/reproducing light spot scans so that the first wobble pit 11 is located right and the second wobble pit 12 is located left with respect to the recording/reproducing light spot 16. The track address is devised to be disposed in the segment so that the track Ta and the track Tb can be reproduced independently (detailed explanation is omitted herein because it is not within the scope of the present invention).

The above-mentioned annealing weakens the magnetic coupling by scanning the land portion 15 at high power by using a light spot for annealing having a spot diameter smaller than that of the recording/reproducing light spot 16. The reason why the size of the light spot for annealing is reduced is to narrow the annealing width even if the track pitch is narrow so as to broaden the track width of DWDD operation area remaining in the groove 14 and to secure the recording/reproducing performance. Therefore, for a light source for annealing light spot, a laser having a wavelength of 405 nm and an objective lens having a NA of 0.75 to 0.85 are used, thereby reducing the diameter of the light spot to the diameter that is about half as compared with the recording/reproducing optical spot having a wavelength of 650 nm and NA of 0.6.

The tracking at the time of annealing is carried out by the continuous servo method using a push-pull signal from the land 15. Even if recording/reproducing wobble pits are used, tracking can be carried out with respect only to grooves but cannot be carried out with respect to lands. If wobble pits only for annealing are disposed, the redundancy of the servo region increases, and eventually high density cannot be attained. Therefore, it is preferable that the tracking is carried out on the land 15 as mentioned above. As the land 15 is continuous, so the tracking precision is increased. Further, it is effective in separating the grooves geometrically and thermally. Therefore, even in a sample servo method, the groove 14 is very effective in an optical disc.

The optical disc substrate shown in FIG. 10B is an example of the optical disc substrate of a land-groove continuous servo method and this is an example corresponding to a DVD-RAM format that is a re-writable type phase-change optical disc. The component unit of this optical disc is a sector and a plurality of sectors constitute a track. The sector includes an address region and a data region. First, the data region is formed of a track including groove 23 or land 24 and has a spiral configuration in which a groove track Tg (2n: even number track) including groove 23 and a land track Tl (2n+1:odd number track) including land 24 are scanned alternately.

Furthermore, in the address region, addresses called CAPA (Complementary Allocated Pit Address) are offset by half of the track pitch. Reference number 21 denotes a LG common address portion shared by the land track Tl that is located at the inner direction seen from a certain groove track Tg. The reference number 22 denotes a GL common address portion shared by the land track Tl that is located at the outer position seen from a certain groove track Tg. Each address portion is formed of prepit groups showing address information. Although not shown in the drawing, onto the groove 23, a clock by the wobble with the amplitude smaller by one digit than the track pitch is superimposed. In order to realize this, by inserting the deflector that is different from the EO deflector 3 into the light beam Lc shown in FIG. 9, the light beam Lc is deflected by the above-mentioned analog deflection mode using the clock superimposing signal separately output from the formatter 101.

FIGS. 11A and 11B are views showing an operation of cutting an optical disc shown in FIG. 10A. When the cutting of this optical disc is carried out, for deflecting the EO deflector 3, the digital deflection mode as mentioned above can be employed (EOD driver 103 is a switching type). FIG. 11A is a timing chart showing a control signal of the cutting apparatus. In the timing chart, from the upper part, (a1) inner position deflection signal Vedi, (a2) outer position deflection signal Vedo, (a3) EOD drive signal Vedd, and (a4) EOM drive signal Vemd are shown.

FIG. 11B shows an optical disc original master to be formed and the path of an optical spot for cutting. In FIG. 11B, from the upper part, (b1) track Ta and (b2) track Tb have that have already been formed, and (b3) Ta track are shown. Since the deflection is carried out in the Ta track like a path shown in FIG. 11B, in the track Tb, the first wobble pit 11 and the second wobble pit 12 are not formed and only the address pit 13 are formed as necessary. (b3) denotes a track Ta that has just been formed in an optical spot 31 for cutting in which prepits and grooves are shown in a hatched pattern.

In the formation of the track Ta shown in (b3), from the time t6 to the next t1 for forming groove 14, the EO modulator 2 emits a light spot 31 for cutting (increase the light intensity) and the EO deflector 3 carries out cutting continuously without deflection. The servo region is formed from the time t1 to t6. The EOM drive signal Vemd emits light when the first wobble pit 11, second wobble pit 12 and address pit 13 are formed in the section.

Furthermore, the EOD drive signal Vedd makes the inner position deflection signal Vedi to be "H" during the time t2 to t3, so that the deflection voltage is output in the direction in which the first wobble pit 11 are displaced toward the inner position; makes the outer deflection signal Vedo to be "H" during the time t4 to t5, so that the deflection voltage is output in the direction in which the second wobble pit 12 are displaced to the outer position; and during the rest of the time, the deflection voltage is output to be 0 so that the displacement becomes 0. As a result, the optical spot 31 for cutting scans the original master 100 passing a path shown by an arrow, forming the prepits and grooves shown in a hatched pattern in combination with the light emitting timing. Note here that the ON/OFF timing of the actual EO drive signal Vemd is adjusted so as to be disposed precisely in the position shown in FIG. 11B on the original master 100.

However, the above-mentioned optical disc cutting apparatus has the following problems. That is:

(Problem 1) When the EO deflector is changed stepwise in the digital deflection mode (hereinafter, referred to as "a step deflection"), unnecessary deflection (fluctuations), which seems to be the relaxation oscillations of the EO crystalline material, is generated. First of all, as shown in FIGS. 10A and 10B, this phenomenon was found through the measurement of tracking error signal of the optical disc, the observation by an electron microscope, or the like. Next, observation was carried out by preparing a deflection amount detector capable of observing the deflection amount in the optical path of the optical disc cutting apparatus. As a result, it was found that the unnecessary deflection is a fixed pattern of noise in the range from, for example, 500 kHz to 700 kHz and that the signal disappears by attenuation about 10 μs after the step deflection. The unnecessary deflection occurs in the header portion of the segments shown by the duration of t7 in FIG. 11B.

The deflection amount is relatively large, for example, 10 to 20 nmpp. Assuming that grooves having a relatively large width (width of the bottom) of 350 nm and a groove depth of 30 nm is formed at the track pitch of 0.50 μm (500 nm), when the side wall of the groove has a tilt angle of 30 degrees, the occupied width of the tilting portion is 30 nm× √3×2=104 nm. As a result, the width of the upper side of the land formed between the grooves becomes at most 46 nm (=500−350−104). So the deflection amount 20 nmpp is not a negligible value. Unless the width of the upper side of the land is maintained to some extent, the above-mentioned annealing cannot be carried out normally, thus causing a severe problem.

As to the cutting, in addition to this, the variations in transporting of the optical head for cutting, in the cutting power, in the sensitivity of the photoresist and in development may cause a variation of the width of the land, thus radically reducing the margin assigned thereto. Needless to say, it is also important to secure the width of the land in the following molding process. Therefore, it is necessary to suppress the variation of the width of the land as much as possible. So this unnecessary deflection observed herein should be suppressed at any cost.

Besides, if the unnecessary deflection is actually present, the grooves, which should essentially be formed straight, are fluctuated. Therefore the disturbance of the signal detection (for example, envelope variation) or the disturbance of the tracking error signal (TE) occurs, thus deteriorating the signal processing or the servo performance. Furthermore, the groove fluctuation itself may change the stress to a recording film, or may affect the thermal distribution at the time of recording/reproducing, to deteriorate the off-track margin at the time of recording and reproducing. In particular, since the header position of the segment and sector is an important part where signals for synchronization are placed, it is necessary to keep recording and reproducing reliability in this portion to be high. Also in this sense, it is indispensable to suppress the unnecessary deflection.

(Problem 2) Furthermore, when the observation is carried out by using the deflection amount detector, two kinds of unnecessary deflections other than that explained in the problem 1 were observed. One is an unnecessary deflection component of rather slower fluctuation having a frequency of 1 Hz or less, which seems to be caused by the fluctuation of air existing in the path of light beam in the cutting apparatus; and another is a deflection component of the fluctuation having frequency of about 100 Hz to 1 kHz, which seems to be caused by the mechanical vibration of each optical part of the cutting apparatus. The former generates a large displacement of about 100 nm or more on the original master. But by covering the cutting apparatus as a whole and suppressing the air flow, the fluctuation can be reduced to about 1/10. However, heat etc. of the laser beam source in the cutting apparatus remains and the airflow cannot absolutely be stopped.

Furthermore, as a measure to this problem, the cutting apparatus may be miniaturized and an optical path itself may be shortened. However, this measure cannot suppress the entire fluctuation completely because of the physical dimension limitation of each optical element constituting the cutting apparatus. This fluctuation of 1 Hz or less does not directly cause the variation in track pitches with respect to the rotation speed of the original master, but may cause fluctuation in the absolute position of the track. The latter fluctuation of 100 Hz to 1 kHz is in the level explained in the problem 1. Since this is in the range of generating the fluctuation in one rotation of the original master, the variation of the track pitches may be caused.

These two kinds of fluctuations are observed similarly in the tangential direction besides in the radial direction of the original master. The fluctuation in the tangential direction causes jitter at the header position and the end position of the prepits or grooves. The fluctuation as mentioned above needs to be suppressed sufficiently in order to obtain a highly precise original master of the optical disc.

(Problem 3) In the above-mentioned problem 1 and problem 2, light beams used for cutting are affected by unnecessary deflection. In addition, it was found that the unnecessary optical variation (variation of light intensity) that is synchronous to the deflection of the problem 1 and problem 2 is observed. The laser beam source itself is controlled to an appropriate level by optical power servo, however, the unnecessary deflection may be caused by the following fluctuation of the EO modulator, the EO deflector, the optical components property or an optical path. Since the variation of the light intensity during the cutting directly changes the size of the prepits or the groove width, this unnecessary variation of light intensity needs to be suppressed.

Therefore, with the foregoing in mind, it is an object of the present invention to provide a high precision optical disc cutting apparatus capable of forming an optical disc original master by suppressing an unnecessary deflection component and an unnecessary light intensity change component and a method for manufacturing an optical disc.

SUMMARY OF THE INVENTION

In order to achieve the above-mentioned object, the first optical disc cutting apparatus of the present invention includes a light beam controller including at least one of an optical modulator for controlling the light intensity of light beam emitted from a laser beam source and an optical deflector for controlling the deflection amount of the light beam in the radial direction on an optical disc original master, a deflection error detector for detecting a deflection error in the radial direction included in the light beam controlled by the light beam controller, a second optical deflector, which is disposed between the light beam controller and the deflection error detector, for deflecting the light beam in the radial direction, and a feedback controller for feeding back a feedback signal using the deflection error in the radial direction to the second optical deflector.

The second optical disc cutting apparatus of the present invention includes a light beam controller including at least one of an optical modulator for controlling the light intensity of light beam emitted from a laser beam source and an optical deflector for controlling the deflection amount of the light beam in the radial direction on an optical disc original master, a deflection error detector for detecting a deflection error in the radial direction included in the light beam controlled by the light beam controller, and a feedback controller for feeding back a feedback signal using the deflection error in the radial direction to the optical deflector, and superimposing the feedback amount onto the control amount of the optical deflector.

The third optical disc cutting apparatus of the present invention includes a light beam controller including an optical deflector for controlling the deflection amount of light beam emitted from a laser beam source in the radial direction on an optical disc original master, a storage for storing a previously measured deflection error in the radial direction when the light beam is deflected by the optical deflector, a second optical deflector for controlling the deflection amount of the light beam from the optical deflector, and a feedforward controller for inputting a feedforward signal using the deflection error in the radial direction stored in the storage to the second optical deflector in accordance with the deflection timing of the light beam controller when cutting of the optical disc original master is carried out.

The fourth optical disc cutting apparatus of the present invention includes a light beam controller including an optical deflector for controlling the deflection amount of light beam emitted from a laser beam source in the radial direction on the optical disc original master, a storage for storing a previously measured deflection error in the radial direction when the light beam is deflected by the optical deflector, and a feedforward controller for inputting a feedforward signal using the deflection error in the radial direction stored in the storage to the optical deflector in accordance with the deflection timing of the light beam controller when cutting of the optical disc original master is carried out.

Next, the first method for manufacturing an optical disc of the present invention includes a cutting of an optical disc original master in which the light beam is controlled by a light beam controller including at least one of an optical modulator for controlling the light intensity of light beam emitted from a laser beam source and an optical deflector for controlling the deflection amount of the light beam in the radial direction on an optical disc original master. The method includes: detecting a deflection error in the radial direction included in the light beam controlled by the light beam controller by a deflection error detector, deflecting light beam in the radial direction by a second optical deflector disposed between the light beam controller and the deflection error detector, and feeding back a feedback signal using the deflection error in the radial direction to the second deflector by a feedback controller.

The second method for manufacturing an optical disc of the present invention includes a cutting of an optical disc original master in which the light beam is controlled by a light beam controller including at least one of an optical modulator for controlling the light intensity of light beam emitted from a laser beam source and an optical deflector for controlling the deflection amount of the light beam in the radial direction on an optical disc original master. The method includes: detecting a deflection error in the radial direction included in the light beam controlled by the light beam controller by a deflection error detector, and feeding back a feedback signal using the deflection error in the radial direction to the optical deflector and superimposing the feedback amount onto the control amount of the optical deflector by a feedback controller.

The third method for manufacturing an optical disc of the present invention includes a cutting of an optical disc original master in which the light beam emitted from a laser beam source is controlled to deflect in the radial direction on the optical disc original master by an optical deflector. The method includes: prior to the cutting of the optical disc original master, previously measuring the deflection error generated in controlling to deflect in the radial direction and storing the measured deflection error in a storage, and in the cutting of the optical disc original master, inputting a feedforward signal using the deflection error stored in the storage to a second optical deflector for controlling the deflection amount of the light beam from the optical deflector in accordance with the deflection timing of the light beam.

The fourth method for manufacturing an optical disc of the present invention includes a cutting of an optical disc original master in which the light beam emitted from a laser beam source is controlled to deflect in the radial direction on the optical disc original master by an optical deflector. The method includes: prior to the cutting of the optical disc original master, previously measuring the deflection error generated in controlling to deflect in the radial direction and storing the measured deflection error in a storage, and in the cutting of the optical disc original master, inputting a feedforward signal using the deflection error to the optical deflector in accordance with the deflection timing of the light beam.

According to the first and second optical disc cutting apparatus of the present invention, since it is possible to detect and suppress unnecessary deflection amount in the optical path in the optical disc cutting apparatus, an optical spot on the optical disc original master can be positioned in a predetermined position accurately. Thus, an optical disc having prepits and grooves with less fluctuation or variation of track pitches can be manufactured. According to the second optical disc cutting apparatus, it is possible to minimize the increase of the optical deflectors to be added for suppressing the deflection amount of the light.

According to the third and fourth optical disc cutting apparatus of the present invention, since the deflection error in the radial direction when the optical beam is deflected by the optical deflector is measured in advance and stored, it is easily possible to suppress the disturbance of the optical deflection amount that is generated at the time of the optical deflection, which is unique to the optical deflection means and not likely to be suppressed by the servo means. According to the fourth optical disc cutting apparatus, it is possible to minimize the increase of the optical deflectors to be added for suppressing the deflection amount of the light.

According to the first and second method for manufacturing an optical disc of the present invention, since it is possible to detect and suppress unnecessary deflection amount in the optical disc cutting process, an optical spot on the optical disc original master can be positioned in a predetermined position accurately and thus an optical disc having prepits and grooves with less fluctuation or track pitch variation can be manufactured. According to the second method for manufacturing an optical disc, it is possible to minimize the increase of the optical deflectors to be added for suppressing the deflection amount of the light.

According to the third and fourth method for manufacturing an optical disc of the present invention, since the process for previously measuring the deflection error controlled to deflect in the radial direction and storing it in the storage is provided prior to the cutting process of the optical disc original master, it is easily possible to suppress the disturbance of the optical deflection amount that is generated at the time of the optical deflection, which is unique to the optical deflection means and not likely to be suppressed by the servo means. According to the fourth method for manufacturing the optical disc, it is possible to minimize the increase of the optical deflectors to be added for suppressing the deflection amount of the light.

It is preferable that the first optical disc cutting apparatus of the present invention further includes a third optical deflector, which is disposed between the light beam controller and the deflection error detector, for deflecting the light beam in the tangential direction on the optical disc original master, wherein the deflection error detector further detects the deflection error in the tangential direction of the light beam controlled by the light beam controller independently from the deflection error in the radial direction, and the feedback controller further feeds back a feedback signal using the deflection error in the tangential direction to the third optical deflector. According to this configuration, it is possible to suppress the fluctuation in the tangential direction in addition to the fluctuation in the radial direction, thus suppressing unnecessary optical deflection amount two dimensionally.

Furthermore, it is preferable that the light beam controller includes the optical modulator; the deflection error detector further detects the intensity error of the light intensity of the light beam controlled by the light beam controller; and the feedback controller further feeds back a feedback signal using the intensity error to the optical modulator.

According to this configuration, an unnecessary optical deflection amount can be suppressed and further the intensity variation of the optical spot at the time of cutting can be suppressed to the desired value. Thus, it is possible to provide an excellent optical disc with less variation in the pit dimension and track pitch.

Furthermore, it is preferable that the light beam controller further includes an optical modulation correcting controller for controlling the light intensity of the light beam controlled by the light beam controller; the deflection error detector further detects the intensity error of the light intensity of the light beam controlled by the light beam controller; and the feedback controller further feeds back a feedback signal using the intensity error to the optical modulation correcting controller.

Also with this configuration, since it is possible to suppress the intensity variation of the optical spot at the time of cutting to be desired value, it is possible to provide an excellent optical disc with less variation in the pit dimension and track pitch.

In the third optical disc cutting apparatus, it is preferable that the deflection direction of the second optical deflector is the same as the deflection direction of the optical deflector, and the feedforward signal is a signal whose polarity of the deflection error in the radial direction is reversed.

Furthermore, it is preferable that the apparatus further includes a deflection error detector for detecting a second deflection error in the radial direction included in the light beam from the second optical deflector, and feedback controller for feeding back a feedback signal using the second deflection error in the radial direction to the second optical deflector.

According to this configuration, it is possible to suppress the deflection amount more reliably.

Furthermore, it is preferable that the optical disc cutting apparatus further includes a third optical deflector, which is disposed between the light beam controller and the deflection error detector, for deflecting the light beam in the tangential direction on the optical disc original master. The deflection error detector further detects the deflection error in the tangential direction of the optical beam controlled by the light beam controller independently from the deflection error in the radial direction, and the feedback controller further feeds back a feedback signal using the deflection error in the tangential direction to the third optical deflector.

According to this configuration, it is possible to suppress the fluctuation in the tangential direction in addition to the fluctuation in the radial direction, thus suppressing the amount of unnecessary optical deflection two dimensionally.

Furthermore, it is preferable that the optical disc cutting apparatus further includes an optical modulator for controlling the light intensity of the light beam controlled by the light beam controller, wherein the deflection error detector further detects the intensity error of the light intensity of the light beam controlled by the light beam controller, and the feedback controller further feeds back a feedback signal using the intensity error to the optical modulator.

According to this configuration, the amount of unnecessary optical deflection can be suppressed and further the intensity variation of the optical spot at the time of cutting can be suppressed to the desired value. Thus, it is possible to provide an excellent optical disc with less variation in the pit dimension and track pitch.

In the fourth optical disc cutting apparatus, it is preferable that the optical disc cutting apparatus further includes a deflection error detector for detecting the second deflection error in the radial direction included in the light beam from the optical deflector, and the feedback controller for feeding back a feedback signal using the second deflection error in the radial direction to the optical deflector and superimposing the feedback amount onto the control amount of the optical deflector.

According to this configuration, the amount of unnecessary deflection can be suppressed more reliably.

It is preferable that in the first method for manufacturing an optical disc, a third optical deflector is further provided, which is disposed between the light beam controller and the deflection error detector, for deflecting the light beams in the tangential direction on the optical disc original master, and wherein in the detecting of the deflection error, the deflection error detector further detects the deflection error in the tangential direction of the light beam controlled by the light beam controller independently from the deflection error in the radial direction, and in the feedback, the feedback controller further feeds back a feedback signal using the deflection error in the tangential direction to the third optical deflector.

According to this configuration, it is possible to suppress the fluctuation in the tangential direction in addition to the fluctuation in the radial direction, thus suppressing the amount of unnecessary optical deflection two dimensionally.

Furthermore, it is preferable that the light beam controller includes the optical modulator, and in the detecting of the deflection error, the deflection error detector further detects the intensity error of the light intensity of light beam controlled by the light beam controller, and in the feedback, the feedback controller further feeds back a feedback signal using the intensity error to the optical modulator.

According to this configuration, the amount of unnecessary optical deflection can be suppressed and further the intensity variation of the optical spot at the time of cutting can be suppressed to the desired value. Thus, it is possible to provide an excellent optical disc with less variation in the pit dimension and track pitch.

Furthermore, it is preferable that the light beam controller further includes an optical modulation correcting controller for controlling the light intensity of the light beam controlled by the light beam controller, and in the detecting of the deflection error, the deflection error detector further detects the intensity error of the light intensity of the light beam controlled by the light beam controller, and in the feedback, the feedback controller further feeds back a feedback signal using the intensity error to the optical modulation correcting controller.

According to this configuration, the intensity variation of the optical spot at the time of cutting can be suppressed to the desired value. Thus, it is possible to provide an excellent optical disc with less variation in the pit dimension and track pitch.

It is preferable that the third method for manufacturing an optical disc further includes: detecting a second deflection error in the radial direction included in the light beam from the second optical deflector by the deflection error detector, and feeding back a feedback signal using a second deflection error in the radial direction to the second optical deflector by a feedback controller.

According to this configuration, the amount of unnecessary deflection can be suppressed more reliably.

Furthermore, it is preferable that in the detecting of the second deflection error in the radial direction, the deflection error in the tangential direction of the light beam controlled by the optical deflector is detected independently from the second deflection error in the radial direction; and in the feedback, the feedback signal using the deflection error in the tangential direction is fed back to a third optical deflector for deflecting the light beam in the tangential direction on the optical disc original master.

According to this configuration, it is possible to suppress the fluctuation in the tangential direction in addition to the fluctuation in the radial direction, thus suppressing the amount of unnecessary optical deflection two dimensionally.

Furthermore, it is preferable that the method for manufacturing an optical disc further includes controlling the light intensity of the light beam controlled by the optical deflector by the optical modulator, wherein in the detecting of the second deflection error, the deflection error detector further detects the intensity error of the light intensity of the light beam controlled by the optical deflector, and in the feedback, a feedback signal using the intensity error is fed back to the optical modulator.

According to this configuration, the amount of unnecessary optical deflection can be suppressed and further the intensity variation of the optical spot at the time of cutting can be suppressed to the desired value. Thus, it is possible to provide an excellent optical disc with less variation in the pit dimension and track pitch.

It is preferable that the fourth method for manufacturing an optical disc, further includes detecting a second deflection error in the radial direction included in light beam from the optical deflector by the deflection error detector, and feeding back a feedback signal using the second deflection error in the radial direction to the optical deflector, and superimposing the feedback amount onto the control amount of the optical deflector by a feedback controller.

According to this configuration, the amount of unnecessary deflection can be suppressed more reliably.

BRIEF DESCRIPTION OF THE DRAWINGS

FIG. 3 is a timing chart to explain an operation of the first embodiment of the present invention.

FIGS. 11A and 11B are timing charts to explain an operation of a sample servo method optical disc cutting apparatus.

DETAILED DESCRIPTION OF THE INVENTION

Hereinafter, the present invention will be explained by way of embodiments with reference to drawings. In the following explanation, an optical disc cutting method uses an optical disc cutting apparatus capable of actually cutting the optical disc original master.

First Embodiment

Figure 1:
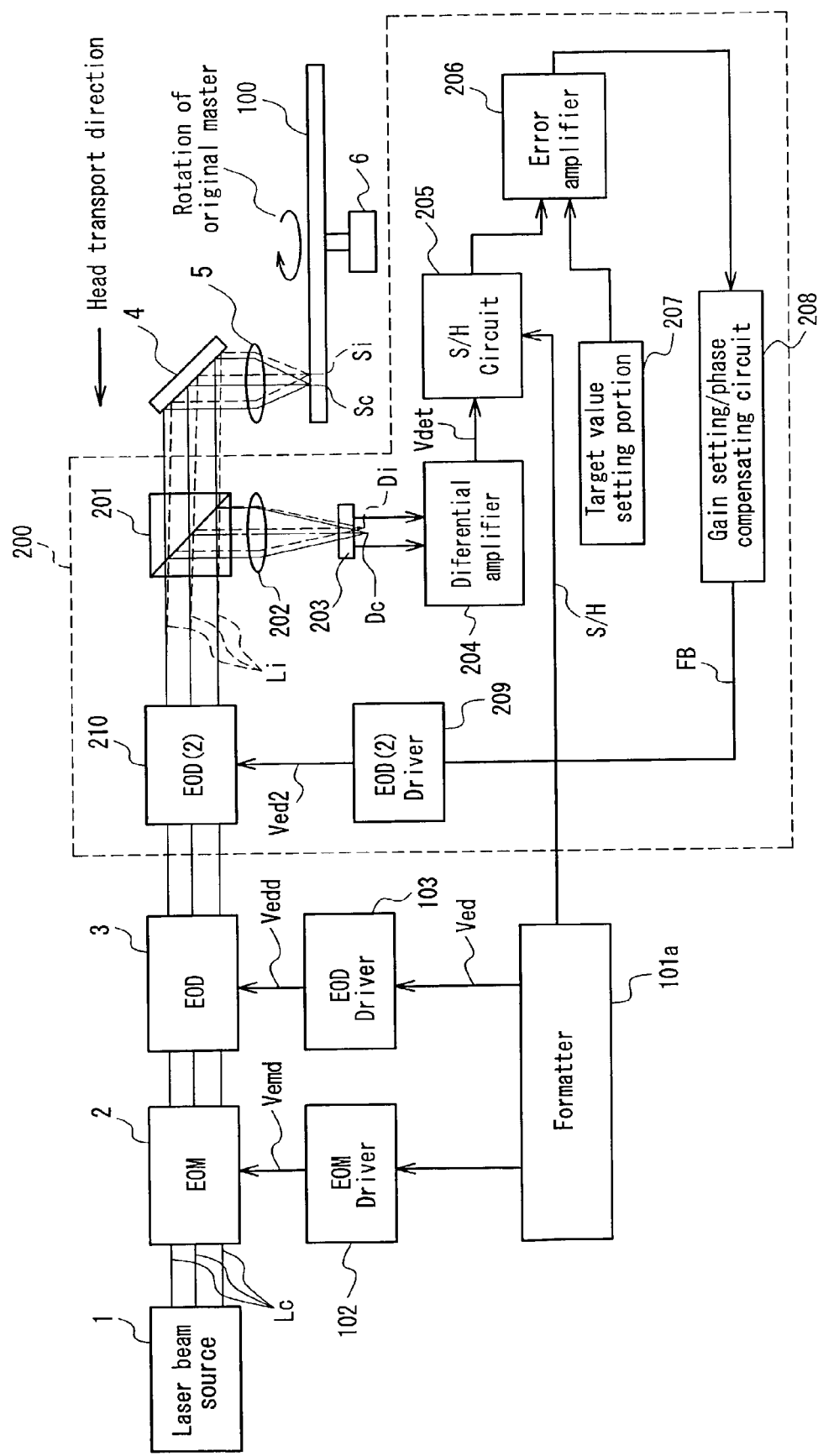
FIG. 1 is a block diagram showing an optical disc cutting apparatus according to a first embodiment of the present invention.

FIG. 1 is a block diagram showing an optical disc cutting apparatus of the first embodiment of the present invention. The block diagram shown in FIG. 1 shows a configuration and process of the optical disc cutting apparatus and also shows the process for manufacturing an optical disc original master in the process of manufacturing the optical disc. The same is true in the following FIGS. 4, 6 and 7.

Figure 9:
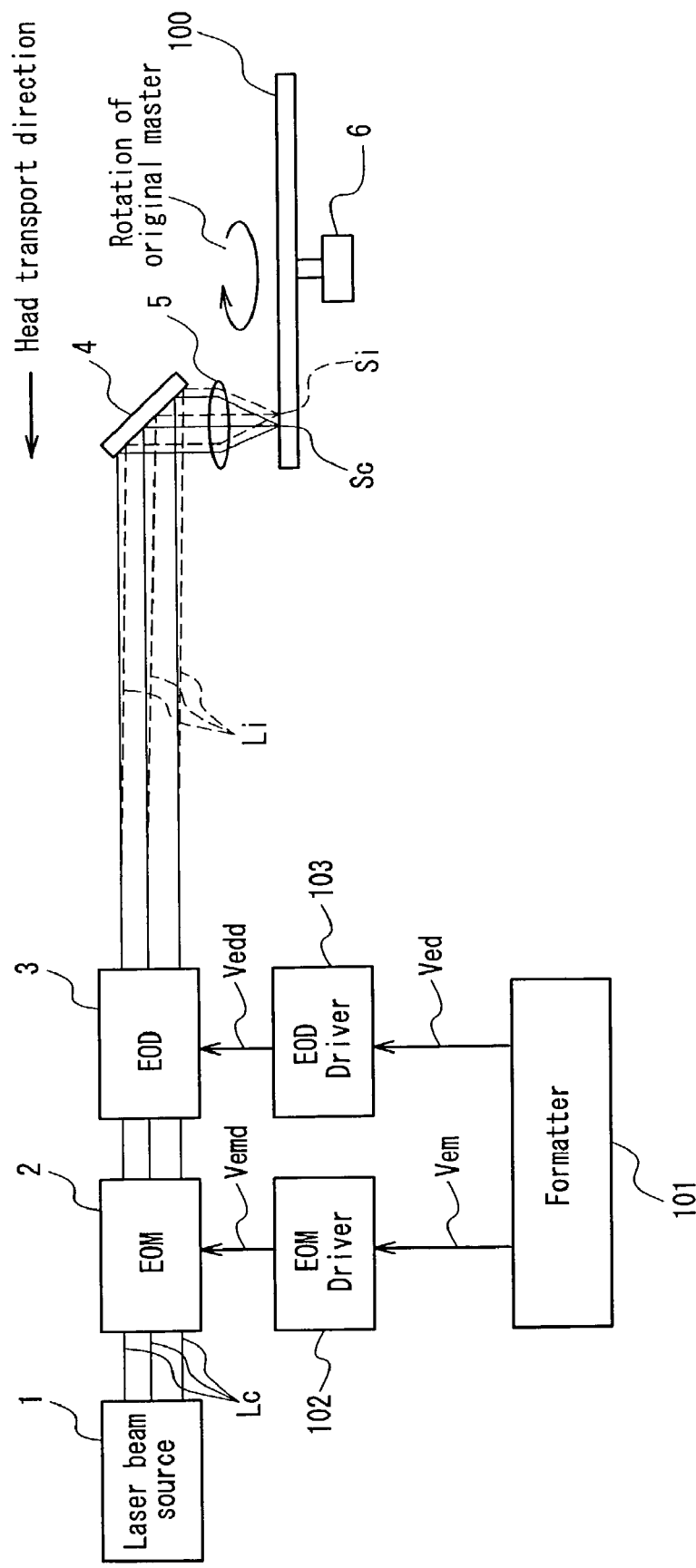
FIG. 9 is a block diagram showing an optical disc cutting apparatus of the prior art.

The same components as those of FIG. 9 are given the same reference numbers and the explanation thereof is herein omitted. Herein, an EO modulator 3 is driven in a digital deflection mode.

Figure 10A:
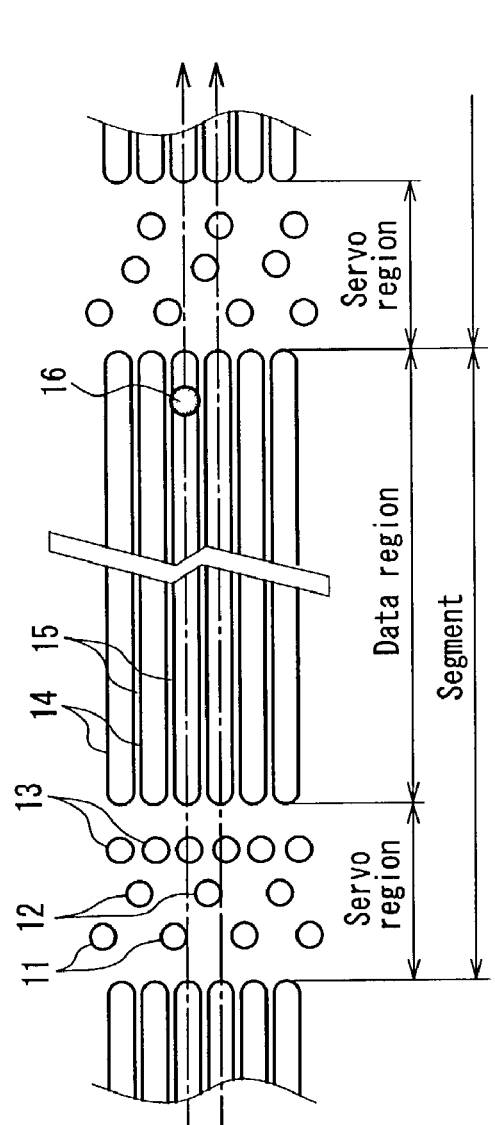
FIGS. 10A and 10B show examples of a configuration of substrate in a sample servo method and continuous servo method respectively of an optical disc suitable for high density.

The format of the optical disc that is subjected to cutting is assumed to be a format of sample servo system with grooves shown in FIG. 10A. This optical disc cutting apparatus additionally includes an unnecessary deflection suppressing portion, which is a servo controller, surrounded by a broken line 200 that suppresses an unnecessary deflection amount in the radial direction of an original master. The main object of this is to suppress an unnecessary deflection after step deflection in the EO deflector mentioned in the problem 1 and to suppress the fluctuations mentioned in the problem 2 by using the servo controller.

In FIG. 1, reference number 201 denotes a beam splitter, 202 denotes a condensing lens, and 203 denotes a 2-element split photo-detector. The 2-element split photo detector 203 is disposed perpendicular to a paper of FIG. 1 and divided into right and left, that is, in the direction corresponding to the radial direction of the original master of the optical disk. The beam splitter 201 splits light beam Lc into an objective lens 5 and a condensing lens 202 at a predetermined ratio. If the power of the laser beam source 1 is sufficient, it is desirable that the splitting ratio is 50% each from the viewpoint of securing SNR of the detection signal, etc. The optical beams toward each lens are required to be maintained in the same shape as that of incident shape into the beam splitter 201.

The condensing lens converges the light beam onto the focus point of Dc. But in front of Dc, the 2-element split photo-detector 203 is disposed. The 2-element split photo detector 203 is mounted on an XYZ stage so that it can be adjusted easily. All the light beam Lc to be converged is led to the effective area of the 2-element split photo detector 203 so that a detection error does not occur due to the lack of the beam shape.

The output of the 2-element split photo detector 203 is connected to a differential amplifier 204 and detected as a deflection detection signal Vdet corresponding to the deflection amount. It is desirable that this differential amplifier 204 also is mounted on the XYZ stage from the viewpoint of securing SNR. Basically, the 2-element split photo detector 203 is aligned so that the deflection detection singal Vdet becomes 0 when the deflection amount is 0.

Figure 2A:
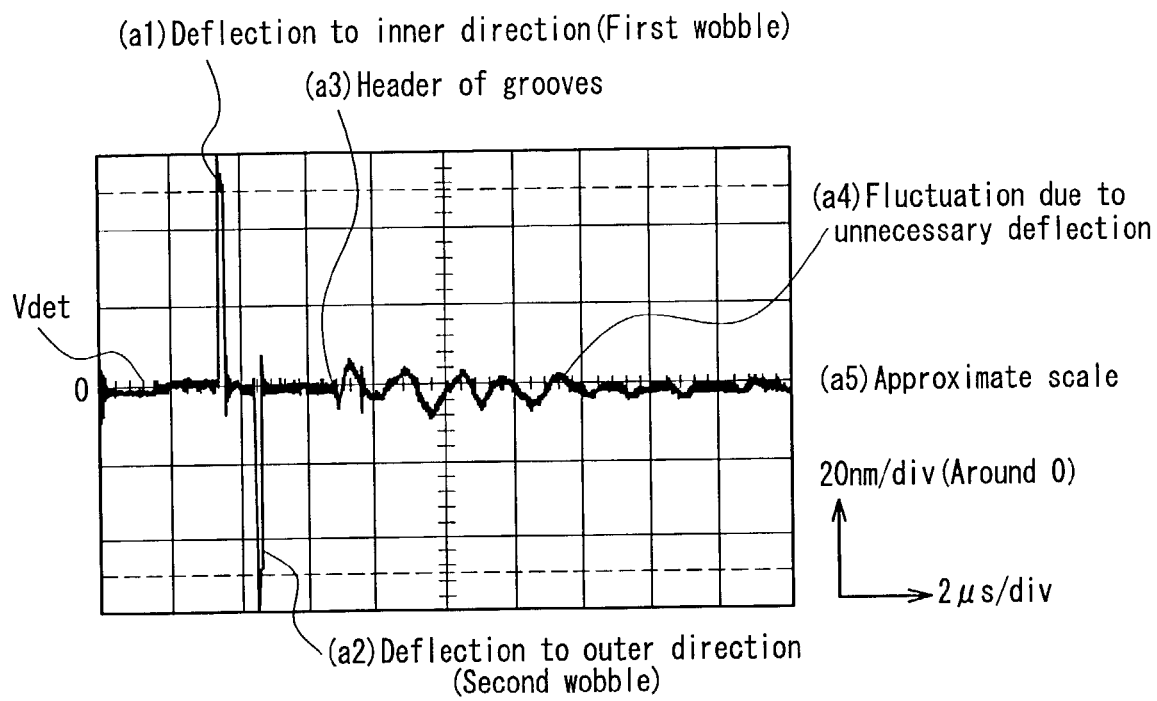
FIGS. 2A and 2B are graphs showing detected unnecessary deflection and the sensitivity of a detection portion respectively, in an optical disc cutting apparatus according to the first embodiment of the present invention.

FIG. 2A shows a deflection detection signal Vdet when actual cutting is carried out. In the waveform shown in FIG. 2A, (a1) is a waveform shown when a first wobble 11 is deflected to the inner position; (a2) is a waveform shown when a second wobble 12 is deflect to the outer position; and (a3) is a waveform shown when the cutting of grooves is started. In particular, right after the deflection, fluctuations due to the unnecessary deflection are observed as shown in (a4).

In this segment, address pits 13 are not formed. It is shown that the fluctuation due to the unnecessary deflection is mostly attenuated 15 μs after the inner position deflection (about 10 μs after the starting point of the groove). The deflection amount is a displacement amount on the original master and the value thereof is about 10 to 20 nmpp. If converting with this scale, the wobble displacement seems to be displaced only about by 60 nm or little less, actually this waveform is a waveform when the displacement amount is about 200 nm. This is because of the non-linearity of detection of deflection shown in FIG. 2B.

In other words, if the 2-element split photo detector is disposed in the vicinity of the focus point of the detection lens (condensing lens) 202 in order to enhance the detection sensitivity by the method for detecting the deflection amount mentioned above, the deflection detection voltage Vdet tends to be saturated. For the linear control, only a region that has a linear form shown by (b1) of FIG. 2B, or it is necessary to partially correct a non-linear portion shown by (b2) if used in a broader range.

In order to increase the linear region, the 2-element split photo-detector 203 may be located farther from the focusing position of the condensing lens to such an extent that the light beam is not subjected to miss the beam shape. However, the detection sensitivity decreases. The confirmation of the linearity can be determined by changing the applied voltage that is proportional to the deflection amount to the EO deflector 3 and plotting the relationship with respect to the deflection detection voltage Vdet.

Referring back to FIG. 1, the deflection detection voltage Vdet is transmitted to a sample hold (S/H) circuit 205. The S/H circuit 205 forms a 20 dB/dec of a first-order low-pass filter by RC.

The sample timing is controlled by the S/H signal from a formatter 101a so that the sample timing corresponds to a section for cutting a groove 14. Actually, as shown in (a5) of FIG. 3, the sample timing is narrowed slightly as compared with the timing of the groove 14. The other timing, that is, a timing during the deflection and a timing having a light intensity of 0, are assumed to be a hold timing.

Note here that, the formatter 101a is different from the formatter 101 shown in FIG. 9 in that the former outputs an S/H signal. Furthermore, FIG. 3 is a timing chart that additionally includes the S/H signal into the timing chart shown in FIG. 11. The remaining portions of FIG. 3 are the same as explained in the conventional example.

The output from the S/H circuit 205 is connected to an error amplifier 206 so that the error of the output of a target value setting portion 207 (herein, the value is set to 0) approaches 0. The output from the error amplifier 206 is transmitted to a gain setting/phase compensation circuit 208 as feedback controller for compensating the phase in accordance with the gain of the servo controller and the necessity.

The output FB as a feed back signal is amplified from DC by a second EOD driver 209 having an analog deflection method. For the second EOD driver 209, a high speed and high voltage bipolar power source is suitable. And here, the output from the gain setting/phase compensation circuit 208 is amplified correctly with a certain gain. The output from the second EOD driver 209 is connected to a second EO deflector 210 disposed between the EO deflector 3 and the beam splitter 201.

According to this embodiment configured as mentioned above, by carrying out an appropriate gain setting with respect to the deflection amount of the original master in the radial direction by the gain setting/phase compensation circuit 208, the fluctuation component of 1 Hz or less and 100 Hz to 1 kHz explained in the problem 2 is sufficiently suppressed by a first order low-pass filter of the S/H circuit 205. However, since the fluctuation after step deflection explained in the problem 1 has fundamental component wave as high as 700 kHz, it was not possible to suppress the amount of fluctuation to only one-severalth due to the influence of the group delay etc. of the second EOD driver 209, and other circuit components. However, the actual amount of fluctuation can be suppressed to several nm or less and further it is possible to suppress the fluctuation in the low band sufficiently. Therefore, it can be said that the practical effect of a high-density optical disc cutting apparatus is great.

In this embodiment, light beams after passing through the beam splitter 201 propagate in an independent optical path and may be affected by the fluctuation of air separately in the respective optical path. Therefore, it is desirable that the beam splitter 201 is positioned as closely to the objective lens 5 as possible and the condensing lens 202 is disposed closely to the beam splitter 201.

Furthermore, in order to avoid such an influence, it is effective to detect the deflection amount from the light reflected from the original master 100. In other words, an optical system around the beam splitter 201 and the objective lens 5 may be changed and light beam Lc may be allowed to pass through the optical system once, focus the light beam Lc on the original master 100 as an optical spot via the objective lens 5, and lead the reflected light to the 2-element split photo detector 203, thus detecting the deflection amount from the optical beam.

However, it this case, it is necessary to avoid missing beam shape and to remove the effect of the disturbance light from the light source for focusing of the objective lens 5.

Furthermore, in order to suppress the servo-gain change due to the change in power setting at the time of cutting, it is preferable that the differential amplifier 204 is provided with an AGC circuit in which both outputs from the 2-element split photo detector 203 are added and the difference of both outputs is divided. Alternately, it is desirable to construct AGC in which the power control signal of the laser light source 1 is transported to the gain setting/phase compensation circuit 208 and the gain is set to be constant.

Furthermore, when the wavelength of the laser light source 1 is shorter than 300 nm, in the case where a general resin sealed Si-based photo-detector is used, light is absorbed by the resin and the detection sensitivity cannot be obtained. Therefore, it is necessary to select a Si-based detector such a Si based photo-detector as packaged in a can covered by silica glass. Furthermore, in this embodiment, when the format for wobbling the groove 14 is formed, by outputting a signal corresponding to the amount of the wobble from the formatter 101 and inputting the signal into the target value setting portion 207 so as to set to the target value of the target value setting portion 207.

Furthermore, in this embodiment, the apparatus including both the EO modulator 2 that is an optical modulating controller and the EO deflector 3 that is an optical deflecting controller is explained as an example. However, according to the format of the optical disc, the apparatus may include any one of the EO modulator 2 and the EO deflector 3.

Furthermore, in this embodiment, the example in which the second EO modulator 210 is provided independently from the EO deflector 3 is explained. However, the feed back signal may be fed back to the EO deflector 3 and the feedback amount may be superimposed onto the control amount of the EO deflector 3 without providing the second EO deflector 210.

Second Embodiment

The following is an explanation of the second embodiment. As mentioned above, although the servo means in the first embodiment is sufficient for practical use, the fluctuation after the step deflection explained in the problem 1 (hereinafter, referred to as the deflection fluctuation) cannot be suppressed to a substantially negligible level. In this embodiment, an optical disc cutting apparatus includes a cancel controller for canceling the deflection fluctuation by using feedforwarding. More specifically, this embodiment is an example in which the cancel means is added to the example of the first embodiment. Of course, depending on the requirement of the format of an optical disc, an optical disc cutting apparatus may be sufficient in which only the cancel controller is mounted by omitting the servo controller of the first embodiment. The same is true in the following third embodiment.

Figure 4:
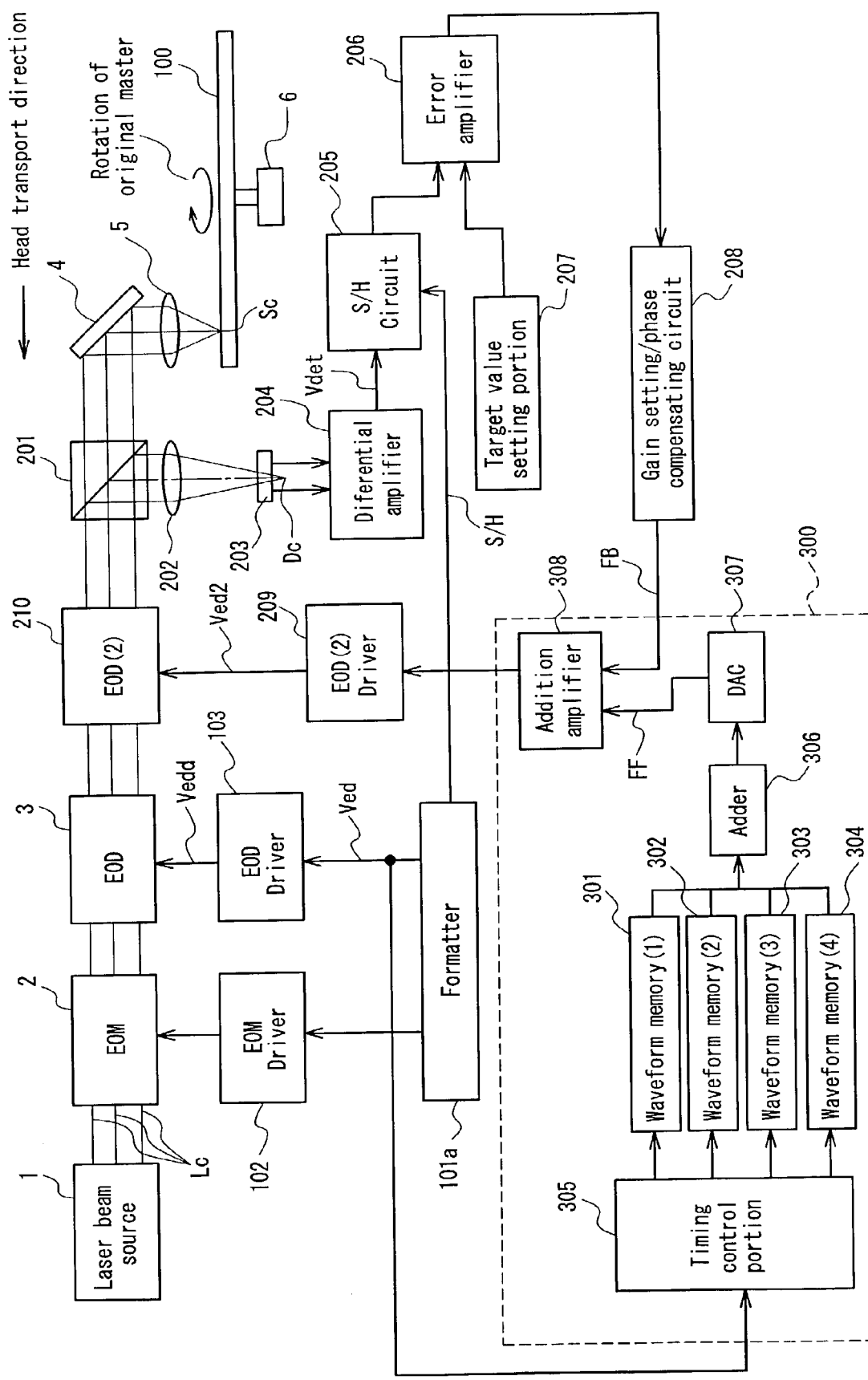
FIG. 4 is a block diagram showing an optical disc cutting apparatus in a second embodiment of the present invention.

FIG. 4 is a block diagram showing an optical disc cutting apparatus according to this embodiment. The same components as in the first embodiment are given the same reference numbers and the explanation thereof is omitted. This optical disc cutting apparatus additionally includes an unnecessary deflection canceling portion shown by a broken line 300 in order to cancel the deflection fluctuation.

In FIG. 4, reference numbers 301 through 304 denote waveform memory (1) through waveform memory (4) in which the deflection fluctuation generated after a step deflection is stored, respectively. Reference number 305 denotes a timing control portion for determining the output timing of each waveform memory and generates a timing based on the deflection signal Ved output from the formatter 101a. Reference number 306 denotes an adder for adding the digital data output from the waveform memory (1) 301 through the waveform memory (4) 304 and outputting the sum of waveform memory as a digital data.

Reference number 307 denotes a DA converter (DAC) as feedforward controller which converts the digital data of the adder 306 into an analog signal and outputs the feedforward signal FF; and 308 denotes an addition amplifier for adding the feedforward signal FF from the unnecessary deflection cancel portion of this embodiment into the feedback FB of the gain setting/phase compensating circuit 208 of the servo means explained in the first embodiment. The output form the adding amplifier 308 drives the second EO deflector 210 via the second EOD driver 209.

Figure 5:
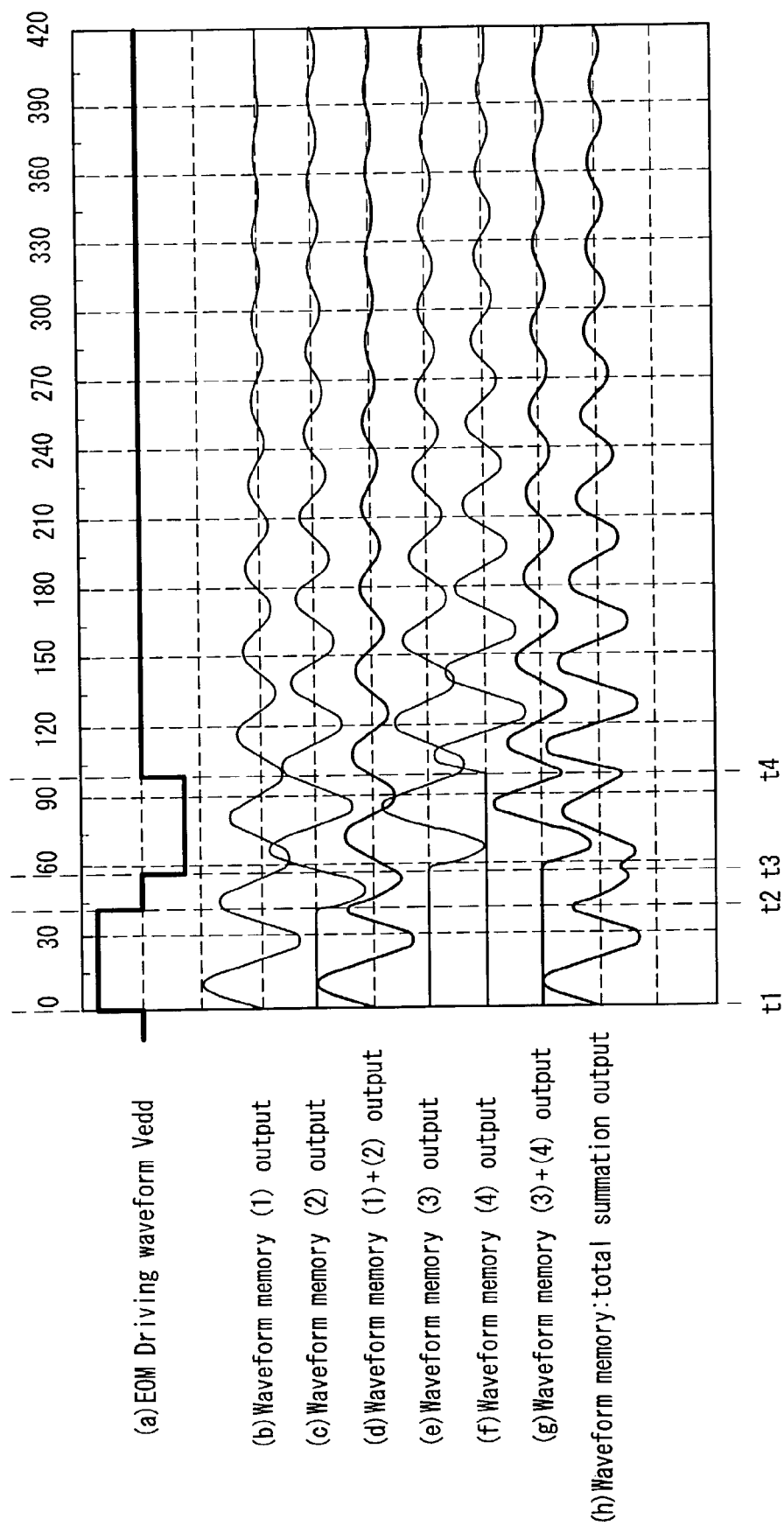
FIG. 5 is a timing chart to explain an operation of the second embodiment of the present invention.

FIG. 5 is a timing chart showing the waveform memory (1) 301 through the waveform memory (4) 304. FIG. 5(a) shows an EOD drive signal Vedd of the EO deflector 3 driven by the deflecting signal Ved. At the time of t1, t2, t3 and t4, the waveform is driven to deflect into the inner position, to return to neutral, to deflect to the outer position and to return to neutral.

The timing control portion 305 outputs the waveform stored respectively in the waveform memory (1) 301 through the waveform memory (4) in the order from t1 to t4. In FIG. 5, data in the waveform memory are digital data, but they are shown as analog waveforms (b), (c), (e) and (f), respectively, for easy understanding. To each of the wave memory, deflection fluctuation after step response of the EO deflector 3 is stored. The storing of the waveform memory is carried out in advance prior to actually carrying out the cutting of the optical disc.

In this explanation, the fluctuation waveform is modeled as a damped oscillation of a sine wave. However, the actual deflection fluctuation is an irregular waveform including the harmonic content and it is not calculated by the calculation but taken by using the digital oscilloscope etc., as a basic observed waveform by adding the step voltage onto the EO deflector 3 used actually.

When the deflection amount at each time is assumed to be the same, the deflection direction and the amount of deflection are adjusted and the above-mentioned basic observed waveform is allowed to be stored in each waveform memory. In this case, the waveform due to the deflection at the time t1 and t4, in which the deflection direction is the same, is stored in the waveform memory (1) 301 and the waveform memory (4) 304.

Furthermore, the deflection direction at the time of t2 and t3 is opposite to the deflection direction at the time of t1 and t4. Therefore, the waveforms having opposite polarities with respect to the waveform due to the deflection at the time of t1 and t4 are stored in the waveform memory (2) 302 and the waveform memory (3) 303.

The feedforward signal FF for suppressing the deflection fluctuation is a summation of the waveform memories shown in (h) in which all of the four waveforms mentioned above are added.

Note here that the start timing of the feedforward signal FF is adjusted by the timing control portion 305 so as to correct the delay of the circuit system, the driving system, etc. Furthermore, the output from the waveform memory is set to zero and stopped at the time the deflection fluctuation can actually be ignored and prepares for the following deflection cycle.

For reference, (d) and (g) in FIG. 5 show the deflection fluctuation at the time of the pulse operation deflecting to the inner position in a waveform memory (1)+(2) and to the outer position in a waveform memory (3)+(4), respectively. If these waveforms are used, in the case of DVD-RAM shown in the prior art, where the deflection occurs four times and the waveform memories increase to eight, waveform memories are saved as four.

Furthermore, the value stored in each waveform memory is different in the polarity but the value is substantially the same. Therefore, it is possible to save to only one waveform memory by controlling the timing of reading out from the waveform memory.

Furthermore, it is preferable that data to be stored in the waveform memory should be averaged so as to eliminate the effect of the disturbance, or only the fluctuation of high band width should be collected while servoing in the range of lower frequency in order to avoid the influence of the fluctuation shown in the problem 2.

According to this embodiment explained above, it is possible to suppress the deflection fluctuation sufficiently, which could not be suppressed perfectly by the servo controller of the first embodiment. Furthermore, in the first embodiment, only the deflection fluctuation of the groove 14 is suppressed. However, in this embodiment, the first wobble pit 11, the second wobble pit 12 and the address pit 13 can be cancelled. Thus, since both the first wobble pit 11 and the second wobble pit 12 can be cancelled, the tracking precision of the sample servo is improved to let the tracking in the center of the groove 14 with high precision.

Third Embodiment

Figure 6:
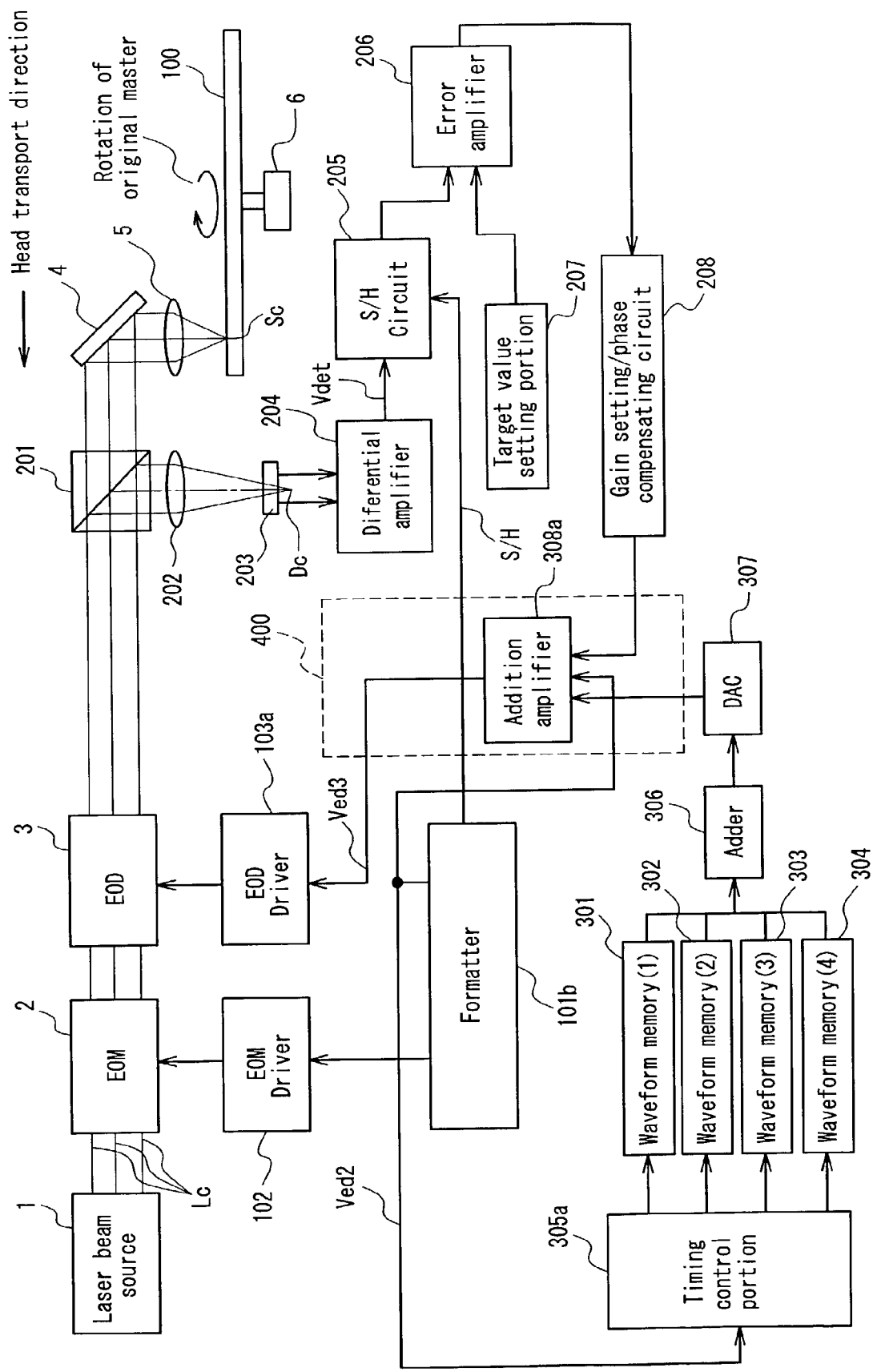
FIG. 6 is a block diagram showing an optical disc cutting apparatus in a third embodiment of the present invention.

The following is an explanation of the third embodiment. This embodiment is an improvement of the second embodiment. Two EO deflectors are used in the second embodiment, but one EO deflector is used in this embodiment. In this embodiment, it is not necessary to add an expensive EO deflector. FIG. 6 is a block diagram showing an optical disc cutting apparatus of the third embodiment. The same components as in the second embodiment are given the same reference numbers and the explanation thereof is omitted. The optical disc cutting apparatus of this embodiment which is different from the EO deflector of the second embodiment are a formatter 101b, a timing control portion 305a, and an addition of amplifier 308a for sharing the EO deflector shown by 400 and an EOD driver 103a. For sharing, the second EOD driver 209 and the second EO deflector 210 are eliminated.

The control signal Ved 2 for controlling EOD driver from the formatter 101b is an analog signal before amplification of the EOD drive signal Vedd shown in (a3) of FIG. 3. The timing signal control portion 305a extracts a timing signal from the control signal Ved2. Needless to say, instead of using the control signal Ved2, it is possible to configure to output the deflection signal Ved that is the same digital signal as in the second embodiment, thus timing control portion may be the same as 305. An adder amplifier 308a forms the EOD control signal Vedd 3 by adding the feedback signal FB, feedforward signal FF and EOD control signal. Herein, the EO deflection mode is assumed to be an analog deflection mode. Therefore, although the cost is somewhat increased, a high voltage, high slew rate and DC amplifier is used as an EOD driver 103a. Since an operation of suppressing unnecessary deflection is basically the same as in the second embodiment, the explanation thereof is omitted.

In the above-mentioned configuration, even if a new EO deflector cannot be inserted into a portion between the EO deflector 3 and the mirror 4, as long as at least the beam splitter 201 can be inserted, the unnecessary deflection can be suppressed. Furthermore, it is possible to avoid the affect of increasing the unnecessary deflection by extending the length of the optical path due to the insertion of a new EO deflector.

Note here that an EO deflector including two EO deflectors in one unit is available. The optical disc cutting apparatus using that can be realized more economically in the second embodiment, since a high voltage and high slew rate DC amplifier is not necessary.

Figure 2B:
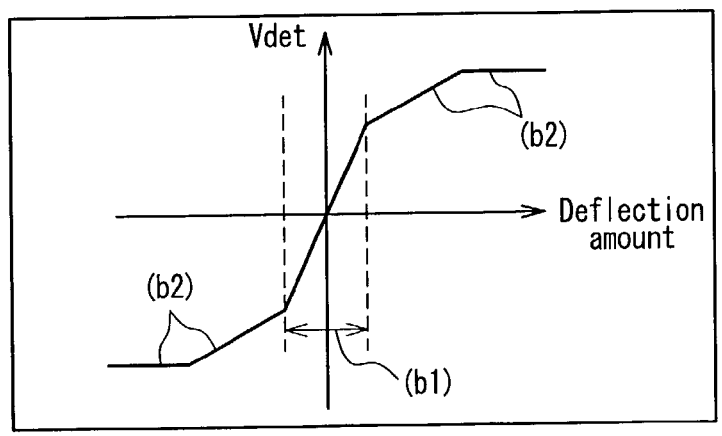

Furthermore, it is possible to carry out the same operation by the change as mentioned below. That is, first, by disposing the EO modulator 2 and the EO deflector 3 in the reverse order, and disposing the beam splitter 201 right behind the EO deflector 3, thereby enabling the deflection amount to be detected at any time. Next, the S/H circuit 205 is assumed to be a sample state at any time and a correcting controller capable of correcting the non-linearity shown in FIG. 2B is inserted between the S/H circuit 205 and the error amplifier 206. Into a target setting portion 207, a deflection signal Ved2 of the formatter 101b is input by separating it from the adding amplifier 308a. The phase compensation function inside the gain setting/phase compensating circuit 208 is transported to the correcting controller so as not to generate a delay. When a closed loop is formed as mentioned above, in the EOD driver 103a, suppression component of the amount of unnecessary deflection detected by the error amplifier is superimposed to a drive signal in which the deflection signal Ved2 is amplified and the signal cancelled by the waveform memory is input. As a result, in the EO deflector 3, unnecessary deflection can be suppressed the asme as in the third embodiment.

Fourth Embodiment

Figure 7:
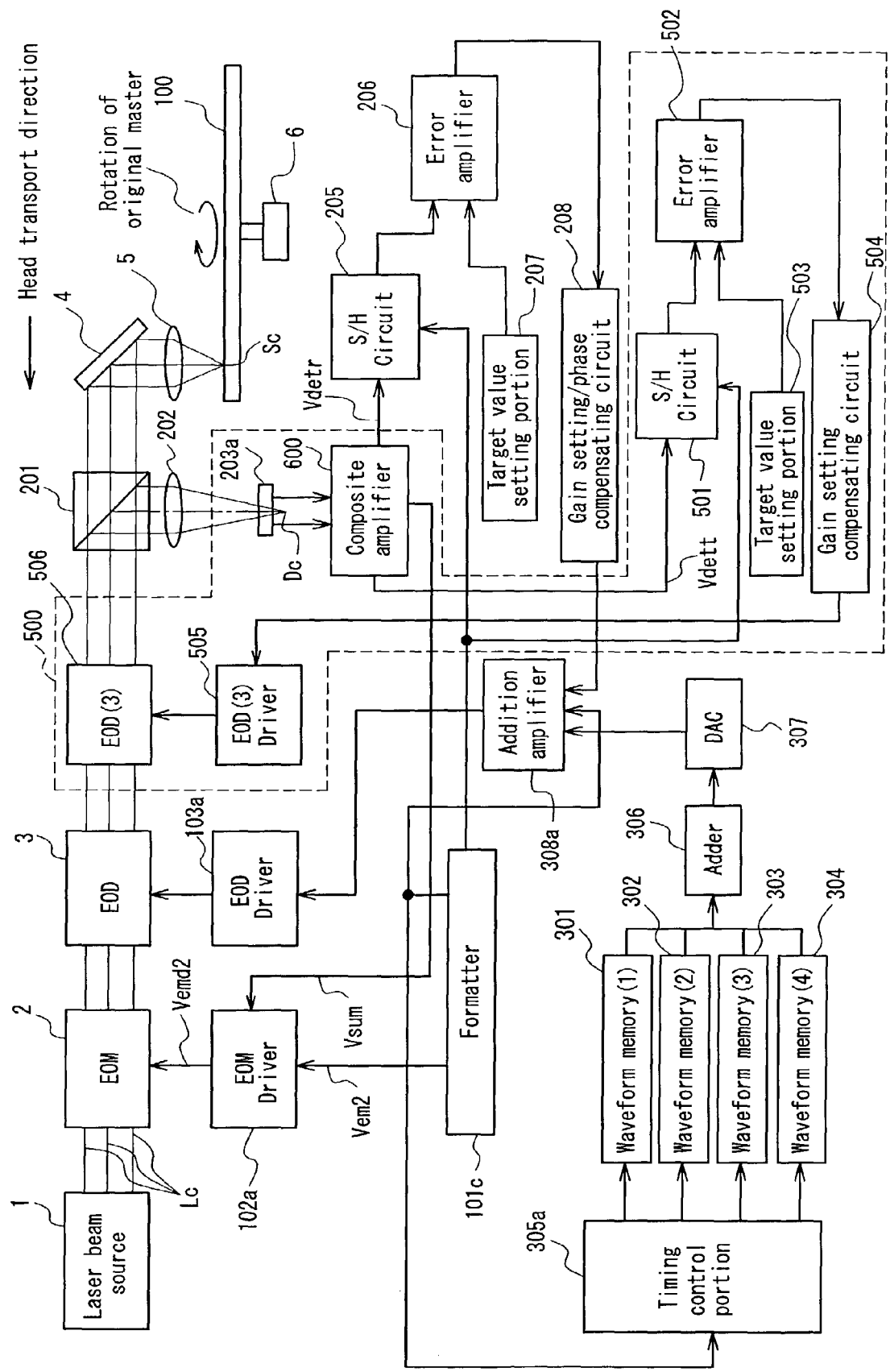
FIG. 7 is a block diagram showing an optical disc cutting apparatus in a fourth embodiment of the present invention.
Figure 8:
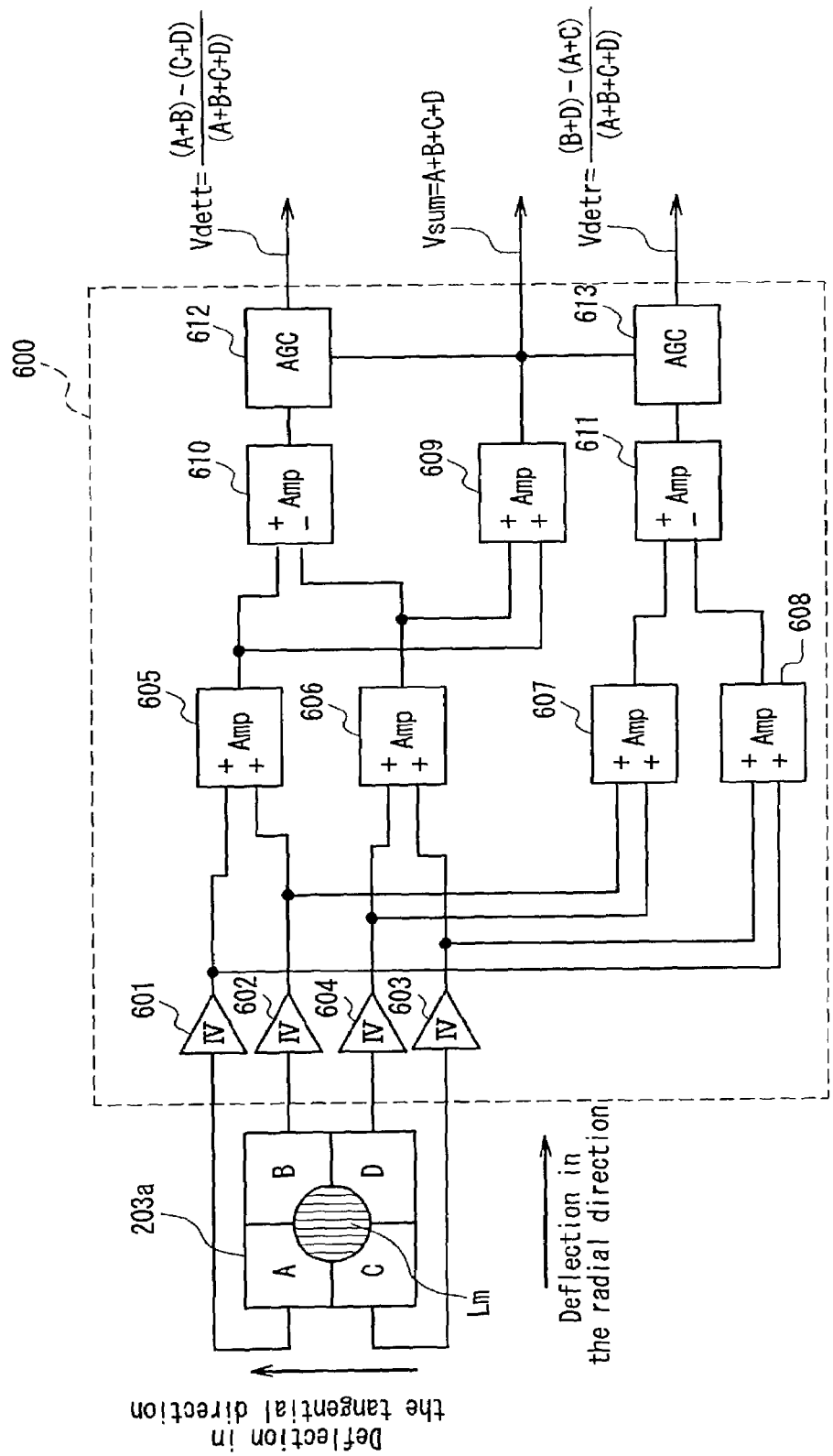
FIG. 8 is a diagram showing a detection portion for detecting the light intensity and deflection amount in a fourth embodiment of the present invention.

The following is an explanation of the fourth embodiment. In the first through the third embodiments, unnecessary deflection only in the radial direction is suppressed. However, in this embodiment, unnecessary deflection in the tangential direction and unnecessary light intensity variation can be suppressed. FIG. 7 is a block diagram showing an optical disc cutting apparatus in the embodiment. The same components as in the third embodiment are given the same reference numbers and the explanation thereof is omitted. Furthermore, FIG. 8 shows an amount of light in this embodiment and a detecting portion of the amount of deflection.

First, FIG. 8 will be explained. In FIG. 8, reference number 203a denotes a 4-element split photo-detector including detection portions A, B, C and D and disposed in the same positions as the 2-element split photo-detector 203 in the first through third embodiments. Lm denotes a light beam formed on the 4-element split photo-detector 203a. When the light beam Lc is deflected on the 4-element split photo-detector 203a, Lm is displaced in the radial direction and the tangential direction shown in FIG. 8. The displacement direction on the 4-element split photo-detector is the same as the direction of the displacement of the optical spot on the original master. The displacement (deflection amount) in the tangential direction is detected by a formula: (A+B)−(C+D) and the displacement in the radial direction (deflection amount) is detected by a formula: (B+D)−(A+C). Each deflection amount is used in a composite amplifier 600. An optical current in each detection portion is converted into the voltage at IV amplifiers 601 through 604. Thereafter, the values in the above-mentioned bracket in the both formulae are calculated in the adding amplifiers 605 through 608. Then, the total light intensity Vsum=(A+B+C+D) of the light beam Lm is calculated in the adding amplifier 609 for suppressing the unnecessary light intensity of the optical disc cutting apparatus besides the below-mentioned AGC. The differential amplifiers 610 and 611 calculate the differences between two terms of the two above-mentioned formulae to get the deflection amount in the tangential direction and the deflection amount in the radial direction, respectively. Furthermore, these values are divided by the total light intensity Vsum of the adding amplifier 609 and a standardized tangential deflection signal Vdett and a standardized radial deflection signal Vdetr are operated and output by the use of the AGC circuits 612 and 613, respectively. Vdetr is substantially the same as Vdet in the first through the third embodiments.

In FIG. 7, an unnecessary deflection suppression portion in the tangential direction and a light amount change suppressing portion, which are surrounded by a broken line 500, are added into the embodiment 3 for the purpose of achieving this embodiment. Reference number 203a denotes the 4-element split photo-detector and 600 denotes the composite amplifier as explained before. The radial deflection signal Vdetr is transmitted to the S/H circuit 205 forming the conventional radial direction deflection suppressing portion and the tangential deflection signal Vedtt is used for suppressing the tangential direction deflection.

A S/H circuit 501, an error amplifier 502, a target setting portion 503, a gain setting/phase compensation circuit 504 and a third EO driver 505 respectively have the same functions as the S/H circuit 205, the error amplifier 206, the target setting portion 207, the gain setting/phase compensation circuit 208 and the second EOD driver 209 in the first embodiments. Reference number 506 denotes a third EO deflector disposed between the EO deflector 3 and the beam splitter 201 and capable of controlling the deflection of the light beam Lc in the tangential direction. Since in the optical disc cutting apparatus, basically, deflection in the tangential direction is not carried out, the tangential deflection signal Vdett itself is regarded as an unnecessary deflection amount. The positioning of the 4-element split photo-detector 203a and the zero adjustments of the circuit system offset voltages are carried out and the target setting portion is set to be zero. Thus, the unnecessary deflection amount in the tangential direction can be suppressed.

Next, the EOM driver 102a is different from the above-mentioned embodiment and has a function of correcting the light intensity variation. That is, a servo controller is configured for amplifying the difference between the target value Vem2 of the light intensity output from the formatter 101c and the total light intensity Vsum, and feeding back to the drive signal Vemd2 of the EO modulator 2 is provided, and Vsum is controlled to be substantially equal to Vem2 to make the light intensity on the original master to be a target value of Vem2. Note here that as mentioned above, when CAV cutting is carried out at the time of cutting of the optical disc original master, this target value is increased appropriately as the cutting position goes outside and is transmitted to the EOM driver 102a so as to be let the cutting appropriate over the original master.

According to the fourth embodiment mentioned above, besides the unnecessary deflection amount in the radial direction, unnecessary deflection amount in the tangential direction and unnecessary light intensity variation also can be suppressed.

In the embodiment with reference to FIG. 7, the configuration including both unnecessary deflection suppression portion in the tangential direction and the optical amount variation suppressing portion was explained as an example. However, the configuration may have only either of the two portions.

Furthermore, a function of suppressing the amount of unnecessary deflection in the tangential direction in this embodiment or a function of correcting the light intensity may be added to the configuration of the first embodiment. In FIG. 1, when the function of correcting the light intensity variation is added to a configuration without the EO modulator 2, the EO modulator that is an optical modulation correcting controller may be added behind the EO deflector 3 and a feedback signal regarding the intensity error may be fed back to the added EO modulator.

(Production of Optical Disc)

The original master made of glass manufactured in the optical disc cutting apparatus explained in the first through fourth embodiments is converted into a stamper in the following mastering step. That is, firstly, a developing process for removing an exposed photoresist where grooves and pits portion are exposed. Next, nickel is vapor-evaporated and disposed on the original master for preparation of plating, and the thickness of nickel is increased by the nickel-plating to form a stamper. Then, the original master and the stamper are separated from each other. Furthermore, the manufactured stamper is processed to have appropriate outer shape and a hole, and the rear surface of the stamper is polished to fit a molding machine. Then the stamper is attached to the molding machine of the optical disc and injection molding of polycarbonate is carried out so as to form a transparent optical disc substrates. Thereafter, recording film and reflection film is formed on the substrate by a sputtering apparatus. If necessary, a protective coat is applied or adhered on the film, and the optical disc is put into a cartridge case etc., thus completed as a desired optical disc.

Thus, the optical disc manufactured by the optical disc cutting apparatus of the present invention can be manufactured so that the size or position of the prepit and the width or pitch of grooves are manufactured precisely in desired position. Therefore, SNR of the prepit reproduction signal is high, variation of the tracking error signal is small, and the groove width and/or land width is stable and precise, so it is possible to improve the performance and margin of recording and reproducing, remarkably. On the contrary, this means that if the optical disc is manufactured by the optical disc cutting apparatus of the present invention, even if the track pitch or pit size is reduced further, the performance and margin of recording and reproducing that is the same as in the conventional cutting apparatus can be secured, thus enabling to form a higher density optical disc.

Note here that in the optical disc cutting apparatus of each embodiment explained above, a one-beam cutting method using one light beam has been explained. In order to suppress the deflection fluctuation, if a two-beam cutting method of carrying out the cutting by using the different light beams for forming the deflecting prepits and forming the not-deflecting grooves is employed, grooves are not affected by the pits' deflection in principle. However, the two-beam cutting method has another problem of difficulties in aligning the two optical spots with high precision, that is, aligning in the two dimensional direction of tangential and radial directions in 0.01 µm or less is very difficult. Even when the two-beam cutting is used, if the amount of unnecessary deflection and the amount of unnecessary light intensity are detected independently from two beams and fed back, high precision cutting of the optical disc can be carried out.

Figure 10B:
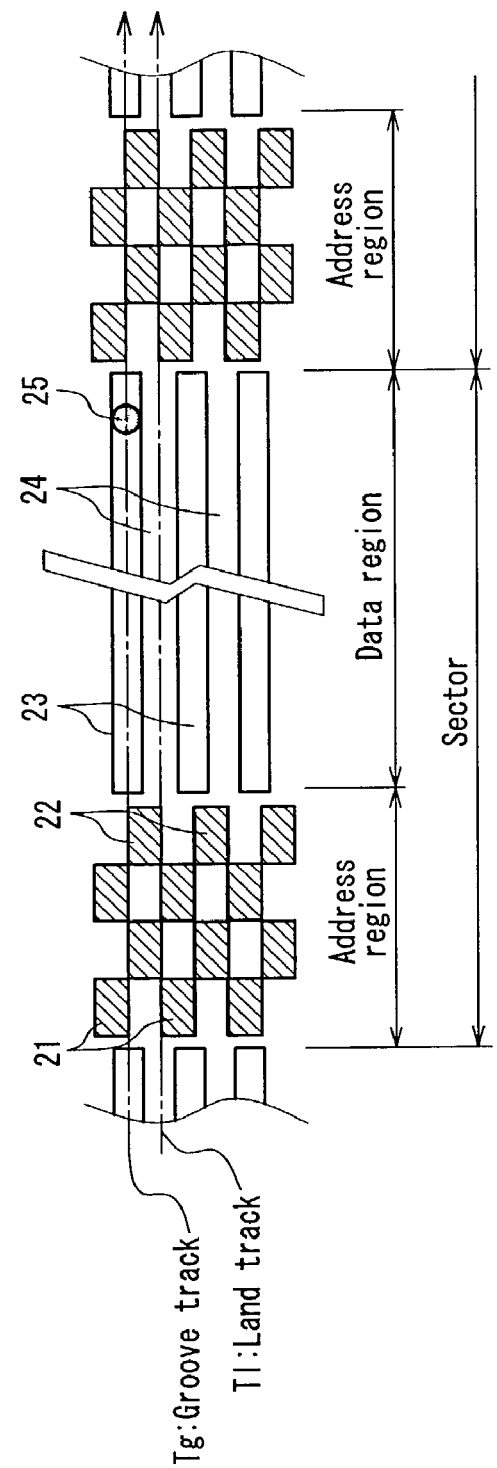

Furthermore, the format of the optical disc that can apply the first through fourth embodiments includes the format of the disc shown in FIG. 10A of the prior art, and any other optical disc format including the format of DVD-RAM shown in FIG. 10B. Even if the optical disc formed of prepits, such as CD or DVD-ROM, is subjected to cutting, the deflection amount during the formation of pits is sampled and suppressing of the unnecessary deflection amount and the variation in the light amount in the radial and tangential directions can be carried out by the present invention. Thus, since the precision of the size and position of the prepits is highly improved and the fluctuations in the radial direction and tangential direction can be sufficiently suppressed, it is possible to improve the SNR and tracking precision, and to reduce jitters. Furthermore, the cutting apparatus is not limited to be applied to the optical disc alone but can be applied to the highly precise system in which a pattern is formed by using a laser beam source.

Furthermore, it has been studied from experimental results that the deflection fluctuation after the EO deflector changed step-wise is reduced by reducing the slew rate of the drive voltage. Therefore, if slow deflection is permitted by the relationship between the cutting speed and the optical format, it is preferable that reduction of the slew rate should be carried out so as to suppress the deflection fluctuation.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical disc cutting apparatus comprising
   a light beam controller comprising at least one of an optical modulator for controlling the light intensity of light beam emitted from a laser beam source and an optical deflector for controlling the deflection amount of the light beam in the radial direction on an optical disc original master,
   a deflection error detector for detecting a deflection error in the radial direction included in the light beam that is controlled by the light beam controller and enters the optical disc orignal master,
   a second optical deflector, which is disposed between the light beam controller and the deflection error detector, for deflecting the light beam in the radial direction, and
   a feedback controller for feeding back a feedback signal using the deflection error in the radial direction to the second optical deflector.

2. The optical disc cutting apparatus according to claim 1, further comprising a third optical deflector, which is disposed between the light beam controller and the deflection error detector, for deflecting the light beam in the tangential direction on the optical disc original master, wherein the deflection error detector further detects the deflection error in the tangential direction of the light beams controlled by the light beam controller independently from the deflection error in the radial direction, and the feedback controller further feeds back a feedback signal using the deflection error in the tangential direction to the third optical deflector.

3. The optical disc cutting apparatus according to claim 1, wherein the light beam controller comprises the optical modulator; the deflection error detector further detects the intensity error of the light intensity of the light beam controlled by the light beam controller; and the feedback controller further feeds back a feedback signal using the intensity error to the optical modulator.

4. The optical disc cutting apparatus according to claim 1, wherein the light beam controller further comprises an optical modulation correcting controller for controlling the light intensity of the light beam controlled by the light beam controller; the deflection error detector further detects the intensity error of the light intensity of the light beam controlled by the light beam controller; end the feedback controller further feeds back a feedback signal using the intensity error to the optical modulation correcting controller.

5. An optical disc cutting apparatus comprising
   a light beam controller comprising at least one of an optical modulator for controlling the light intensity of light beam emitted from a laser beam source and an optical deflector for controlling the deflection amount of the light beams in the radial direction on an optical disc original master,
   a deflection error detector for detecting a deflection error in the radial direction included in the light beam that is controlled by the light beam controller and enters the optical disc original master, and
   a feedback controller for feeding back a feedback signal using the deflection error in the radial direction to the optical deflector, and superimposing the feedback amount onto the control amount of the optical deflector.

6. A method for manufacturing an optical disc, comprising a cutting of an optical disc original master in which the light beam is controlled by a light beam controller comprising at least one of an optical modulator for controlling the light intensity of light beam emitted from a laser beam source and an optical deflector for controlling the deflection amount of the light beam in the radial direction on an optical disc original master, the method comprising:

detecting a deflection error in the radial direction included in the light beam that is controlled by the light beam controller and enters the optical disc original master by a deflection error detector, deflecting light beam in the radial direction by a second optical detlector disposed between the light beam controller and the deflection error detector, and feeding back a feedback signal using the deflection error in the radial direction to the second deflector by a feedback controller.

7. The method for manufacturing an optical disc according to claim 6, wherein a third optical deflector is further provided, which is disposed between the light beam controller and the deflection error detector, for deflecting the light beam in the tangential direction on the optical disc original master, and wherein in the detecting of the deflection error, the deflection error detector further detects the deflection error in the tangential direction of the light beam controlled by the light beam controller independently from the deflection error in the radial direction, and in the feedback, the feedback controller further feeds back a feedback signal using the deflection error in the tangential direction to the third optical deflector.

8. The method for manufacturing an optical disc according to claim 6, wherein the light beam controller comprises the optical modulator, and wherein in the detecting of the deflection error, the deflection error detector further detects the intensity error of the light intensity of light beam controlled by the light beam controller, and in the feedback, the feedback controller further feeds back a feedback signal using the intensity error to the optical modulator.

9. The method for manufacturing an optical disc according to claim 6, wherein the light beam controller further comprises an optical modulation correcting controller for controlling the light intensity of the light beam controlled by the light beam controller, and wherein in the detecting of the deflection error, the deflection error detector further detects the intensity error of the light intensity of the light beam controlled by the light beam controller, and in the feedback, the feedback controller further feeds back a feedback signal using the intensity error to the optical modulation correcting controller.

10. A method for manufacturing an optical disc, comprising a cutting of an optical disc original master in which the light beam is controlled by a light beam controller comprising at least one of an optical modulator for controlling the light intensity of light beam emitted from a laser beam source and an optical deflector for controlling the deflection amount of the light beams in the radial direction on an optical disc original master, the method comprising:

detecting a deflection error in the radial direction included in the light beam that is controlled by the light beam controller and enters the optical disc original master by a deflection error detector, and feeding back a feedback signal using the deflection error in the radial direction to the optical deflector and superimposing the feedback amount onto the control amount of the optical deflector by a feedback controller.

\* \* \* \* \*

UNITED STATES PATENT AND TRADEMARK OFFICE
CERTIFICATE OF CORRECTION

PATENT NO. : 7,180,842 B2 Page 1 of 1
APPLICATION NO. : 10/264592
DATED : February 20, 2007
INVENTOR(S) : Ishibashi et al.

It is certified that error appears in the above-identified patent and that said Letters Patent is hereby corrected as shown below:

Column 22, line 45(claim 4): "end" should read --and--.
Column 23, line 10(claim 6): "detlector" should read --deflector--.

Signed and Sealed this

Sixteenth Day of October, 2007

JON W. DUDAS
*Director of the United States Patent and Trademark Office*